US012630272B1

(12) United States Patent
Surma et al.

(10) Patent No.: US 12,630,272 B1
(45) Date of Patent: May 19, 2026

(54) SYSTEMS AND METHODS FOR SECURITY AND SAFETY MONITORING OF A MARINE VESSEL USING A VISION SYSTEM OF THE MARINE VESSEL

(71) Applicant: Brunswick Corporation, Mettawa, IL (US)

(72) Inventors: Eric T. Surma, Ormond Beach, FL (US); Corey L. Bruno, Fond du Lac, WI (US)

(73) Assignee: Brunswick Corporation, Mettawa, IL (US)

( * ) Notice: Subject to any disclaimer, the term of this patent is extended or adjusted under 35 U.S.C. 154(b) by 231 days.

(21) Appl. No.: 18/506,705

(22) Filed: Nov. 10, 2023

(51) Int. Cl.
| | |
|---|---|
| *B63B 79/40* | (2020.01) |
| *B63B 43/00* | (2006.01) |
| *B63B 79/10* | (2020.01) |
| *B63H 21/21* | (2006.01) |
| *G06V 20/52* | (2022.01) |
| *G06V 40/16* | (2022.01) |
| *H04N 7/18* | (2006.01) |

(52) U.S. Cl.
CPC .............. *B63B 79/10* (2020.01); *B63B 43/00* (2013.01); *B63B 79/40* (2020.01); *B63H 21/21* (2013.01); *G06V 20/52* (2022.01); *G06V 40/161* (2022.01); *G06V 40/172* (2022.01); *H04N 7/181* (2013.01); *H04N 7/188* (2013.01); *B63H 2021/216* (2013.01)

(58) Field of Classification Search
CPC ......... B63B 79/10; B63B 79/40; B63B 43/00; G06V 20/52; G06V 40/172; G06V 40/161; B63H 21/21; B63H 2021/216; H04N 7/181; H04N 7/188
See application file for complete search history.

(56) References Cited

U.S. PATENT DOCUMENTS

| | | | |
|---|---|---|---|
| 6,273,771 B1 | 8/2001 | Buckley et al. | |
| 6,400,835 B1* | 6/2002 | Lemelson ............ | G06V 40/161 |
| | | | 382/118 |
| 9,284,032 B1 | 3/2016 | Snyder et al. | |
| 10,372,976 B2 | 8/2019 | Kollmann et al. | |
| 11,718,375 B2 | 8/2023 | Gonring | |
| 2016/0300242 A1* | 10/2016 | Truong .................. | G01S 19/13 |
| 2024/0104944 A1* | 3/2024 | Akimoto ................ | B60R 25/25 |

* cited by examiner

*Primary Examiner* — Calvin Cheung
(74) *Attorney, Agent, or Firm* — Andrus Intellectual Property Law, LLP

(57) ABSTRACT

A system for monitoring a marine vessel using a vision system of the marine vessel is provided, the system comprising: a camera configured to be mounted to the marine vessel with an associated field of view of that includes an area associated with an operation console of the marine vessel; one or more hardware processors configured to: determine whether the marine vessel is in an actively operating state; in response to determining that the marine vessel is in an actively operating state, use image data captured by the camera to determine whether a person at the operation console of the marine vessel is an authorized operator; and regulate control of the marine vessel based on whether the person at the operation console of the marine vessel is an authorized operator.

23 Claims, 6 Drawing Sheets

SYSTEMS AND METHODS FOR SECURITY AND SAFETY MONITORING OF A MARINE VESSEL USING A VISION SYSTEM OF THE MARINE VESSEL

FIELD

The present disclosure generally relates to systems and methods for security and safety monitoring of a marine vessel using a vision system of the marine vessel.

BACKGROUND

The following U.S. Patents are incorporated herein by reference, in entirety:

U.S. Pat. No. 9,284,032 discloses a control system and method for deterring theft of a marine vessel. A security control circuit receives a transponder identification code from a transponder. The engine control circuit has a status that is based on a comparison of a stored identification code with the transponder identification code. The status of the engine control circuit is locked if the stored identification code does not match the transponder identification code and the status of the engine control circuit is unlocked if the stored identification code does match the transponder identification code. The security control circuit determines an arbitrated lock status of the control system based on a conjunctive analysis of the locked and unlocked statuses of a plurality of engine control circuits connected to a network bus, and indicates the arbitrated lock status to an operator of the marine vessel.

U.S. Pat. No. 10,372,976 discloses an object detection system for a marine vessel having at least one marine drive includes at least one image sensor positioned on the marine vessel and configured to capture an image of a marine environment on or around the marine vessel, and a processor. The object detection system further includes an image scanning module executable on the processor that receives the image as input. The image scanning module includes an artificial neural network trained to detect patterns within the image of the marine environment associated with one or more predefined objects, and to output detection information regarding a presence or absence of the one or more predefined objects within the image of the marine environment.

U.S. Pat. No. 11,718,375 discloses a wireless lanyard system for a marine vessel propelled by at least one propulsion device, the system comprising an operator fob configured to be worn by an operator of the marine vessel, a helm transceiver configured to receive radio signals from the operator fob and a controller. The controller is configured to define a permitted zone with respect to a helm area of the marine vessel based on at least one vessel condition, determine based on communications between the operator fob and the helm transceiver whether the operator is within the permitted zone with respect to the helm area, and generate a lanyard event when the operator is not within the permitted zone.

SUMMARY

In accordance with some embodiments of the disclosed subject matter, a system for monitoring a marine vessel using a vision system of the marine vessel is provided, the system comprising: a camera configured to be mounted to the marine vessel with an associated field of view of that includes an area associated with an operation console of the marine vessel; one or more hardware processors configured to: determine whether the marine vessel is in an actively operating state; in response to determining that the marine vessel is in an actively operating state, use image data captured by the camera to determine whether a person at the operation console of the marine vessel is an authorized operator; and regulate control of the marine vessel based on whether the person at the operation console of the marine vessel is an authorized operator.

In some embodiments, the actively operating state comprises a state in which a propulsion system of the marine vessel is configured to provide propulsion.

In some embodiments, the one or more hardware processors are further configured to: receive image data captured by the camera; determine, using the image data captured by the camera, whether a face is present in the image data captured by the camera; in response to determining that a face is present, determine that the face corresponds to a face of an authorized operator; and determine, based on a presence of the authorized operator in the image data, that a person at the operation console is an authorized operator.

In some embodiments, the one or more hardware processors are further configured to: determine whether the face corresponds to a face of an authorized operator using data stored in a memory of the marine vessel that includes features associated with each of one or more authorized operators that is useable to determine whether a face present in the image data corresponds to a face used to generate the features associated with a particular authorized operator of the one or more authorized operators.

In some embodiments, the one or more hardware processors are further configured to: receive an indication that the marine vessel has transitioned from an inactive state to an actively operating state; receive image data captured by the camera that includes any people in the area associated with the operation console when the indication is received; determine, using the image data captured by the camera, that one or more faces are present in the image data captured by the camera; determine that no face in the image data corresponds to a face of an authorized operator; in response to determining that no face in the image data corresponds to a face of an authorized operator, regulate control of the marine vessel to inhibit operation of a propulsion system of the marine vessel; and provide, using the wireless communication system of the marine vessel, at least one image including the one or more faces present in the image data to one or more of the as least one users associated with the marine vessel.

In some embodiments, the one or more hardware processors are further configured to: receive an indication that the marine vessel has transitioned from an inactive state to an actively operating state; receive image data captured by the camera that includes any people in the area associated with the operation console when the indication is received; determine, using the image data captured by the camera, that one or more faces are present in the image data captured by the camera; determine that at least one of the faces in the image data corresponds to a face of an authorized operator; in response to determining that an authorized operator is present, regulate control of the marine vessel to permit normal operation of a propulsion system of the marine vessel; receive, at a time subsequent to permitting normal operation of the propulsion system and while the marine vessel remains in the actively operating state, image data captured by the camera that includes the area associated with the operation console; and determine, based on the image data received at the time subsequent to permitting normal operation of the propulsion system, that no authorized operator is present in the area associated with the operation console; and regulate control of the marine vessel to inhibit operation of the propulsion system of the marine vessel based on the determination that an authorized operator is present.

In some embodiments, the one or more hardware processors are further configured to: determine that a predetermined period of time has elapsed since a most recent time at which a face of an authorized operator was present in image data received from camera; regulate control of the marine vessel to inhibit operation of the propulsion system of the marine vessel based on the determination that the predetermined period of time has elapsed; and provide an alert indicating that operation of the propulsion system has been inhibited.

In some embodiments, the one or more hardware processors are further configured to: determine that a control input has been received during a time period when no authorized operator is present in the area associated with the operation console; regulate control of the marine vessel to inhibit operation of the propulsion system of the marine vessel based on the determination that the control input was received during the time period when no authorized operator is present in the area associated with the operation console; and provide an alert indicating that operation of the propulsion system has been inhibited.

In some embodiments, the one or more hardware processors are further configured to: in response to determining that the marine vessel is not in an actively operating state, use image data captured by the camera to monitor security of the marine vessel; determine that unauthorized activity has occurred in connection with the marine vessel based on the image data captured while monitoring security of the marine vessel; and in response to determining that unauthorized activity has occurred in connection with the marine vessel, provide, using a wireless communication system of the marine vessel, at least one image captured by the camera to at least one user associated with the marine vessel, wherein the at least one image is indicative of the unauthorized activity.

In some embodiments, the one or more hardware processors are further configured to: determine, while the marine vessel is not in an actively operating state, that image data is to be captured based on one or more conditions being satisfied; and in response to determining that an image is to be captured, cause the camera to capture image data while the vessel is not in an actively operating state.

In some embodiments, the one or more hardware processors are further configured to: determine that a predetermined period of time has elapsed since a most recent time at which image data was received from the camera; and determine that a condition of the one or more conditions is satisfied based on the determination that the predetermined period of time has elapsed since the most recent time at which image data was received from the camera.

In some embodiments, the predetermined period of time is about one hour when the marine vessel is receiving shore power, and is greater than one hour when the marine vessel is not receiving shore power and is using battery power.

In some embodiments, the system comprises: a plurality of cameras, including the camera, wherein each of the plurality of cameras is configured to be mounted to the marine vessel with an associated field of view, and wherein a field of view associated with one of the plurality of cameras includes an area where a person is expected to board the marine vessel; and wherein the one or more hardware processors are further configured to: determine that motion is detected in the area where a person is expected to board the marine vessel; and cause a length of the predetermined period of time to decrease at least temporarily based on the determination that motion is detected in the area where a person is expected to board the marine vessel, such that each of the plurality of cameras at least temporarily captures image data more frequently.

In some embodiments, the system comprises: a plurality of cameras, including the camera, wherein each of the plurality of cameras is configured to be mounted to the marine vessel with an associated field of view; and wherein the one or more hardware processors are further configured to: determine, based on image data from at least one camera of the plurality of cameras, that a face is present in a field of view associated with the at least one camera; and cause a length of a predetermined period of time to decrease at least temporarily based on the determination that a face is detected in the field of view associated with the at least one camera, such that each of the plurality of cameras at least temporarily captures image data more frequently.

In some embodiments, the one or more hardware processors are further configured to: determine that the marine vessel is trailered; receive, subsequent to determining that the marine vessel is trailered, data indicative of motion of the marine vessel; determine, based on the data indicative of motion, that motion of the vessel exceeds a threshold; and determine that a condition of the one or more conditions is satisfied based on the motion of the vessel exceeding the threshold.

In some embodiments, the one or more hardware processors are further configured to: receive image data captured by the camera while the vessel is not in an actively operating state; determine, using the image data captured by the camera while the vessel is not in an actively operating state, that at least one face is included in the image data and that no face in the image data corresponds to a face of an authorized operator; and provide, using the wireless communication system of the marine vessel, at least one image including the at least one face to one or more of the as least one users associated with the marine vessel.

In some embodiments, the one or more hardware processors are further configured to: receive instructions indicating one or more time periods when the marine vessel is expected to be secured and inactive; receive instructions indicating which of a plurality of authorized operators is authorized to operate the marine vessel during time periods when the marine vessel is expected to be secured and inactive; determine that the image data captured by the camera while the vessel is not in an actively operating state was captured during a time period when the marine vessel is expected to be secured and inactive; determine that no face included in the image data captured by the camera while the vessel is not in an actively operating state corresponds to a face of an authorized operator that is permitted to operate the marine vessel during time periods when the marine vessel is expected to be secured and inactive; and provide, using the communication system, at least one image based on the image data captured by the camera while the vessel is not in an actively operating state to one or more of the as least one users associated with the marine vessel.

In some embodiments, the one or more hardware processors are further configured to: receive instructions indicating one or more time periods when the marine vessel is expected to be secured and inactive; determine that the image data captured by the camera while the vessel is not in an actively operating state was captured during a time period when the marine vessel is expected to be secured and inactive; determine that one or more faces are present in the image data captured by the camera while the vessel is not in an actively operating state; determine that no mobile device associated with the marine vessel is in a vicinity of the marine vessel at a time when the image data captured by the camera while the vessel is not in an actively operating state was captured; and provide, using the communication system, at least one image based on the image data captured by the camera while the vessel is not in an actively operating state to one or more of the as least one users associated with the marine vessel.

In some embodiments, the mobile device comprises: an operator fob, wherein the one or more hardware processors are further configured to: determine whether a radio signal has been received from the operator fob; and determine that the operator fob is not in the vicinity of the marine vessel based on a determination that no radio signal was received from the operator fob during a time period corresponding to a time when the image data captured by the camera while the vessel is not in an actively operating state was captured; or a computing device configured to communicate with the marine vessel via the communication system, wherein the computing device is associated with a particular user of the one or more users, and wherein the one or more hardware processors are further configured to: receive, from the computing device using the communication system, location information indicative of a current location of the computing device; and determine that the computing device is not in the vicinity of the marine vessel based on a distance between the location information and a current location of the marine vessel.

In some embodiments, the one or more hardware processors are further configured to: determine that no faces are present in the image data captured by the camera while the vessel is not in an actively operating state; determine, using the image data and previously captured image data, whether the vessel is moving; and in response to determining that the vessel is moving, provide, using the wireless communication system of the marine vessel, at least one image indicative of movement of the vessel.

In some embodiments, the one or more hardware processors are further configured to: receive, via the wireless communication system of the marine vessel, an instruction to inhibit operation of a propulsion system of the marine from a computing device associated with a particular user of the one or more users; and regulate control of the marine vessel to inhibit operation of the propulsion system of the marine vessel based on the instruction.

In accordance with some embodiments of the disclosed subject matter, a for monitoring a marine vessel using a vision system of the marine vessel is provided, the method comprising: determining whether the marine vessel is in an actively operating state; in response to determining that the marine vessel is in an actively operating state, using image data captured by a camera to determine whether a person at an operation console of the marine vessel is an authorized operator, wherein the camera is configured to be mounted to the marine vessel with an associated field of view of that includes an area associated with the operation console of the marine vessel; and regulating control of the marine vessel based on whether the person at the operation console of the marine vessel is an authorized operator.

BRIEF DESCRIPTION OF THE DRAWINGS

The present disclosure is described with reference to the following drawings.

DETAILED DESCRIPTION

Many boat owners leave their boats unattended for hours, days, or weeks at a time (e.g., in a marina, at dock, at a mooring ball, at anchor, etc.), and are often unable to monitor the condition of the vessel while it is unattended. Geofencing theft deterrence and ignition keylocks currently used in the marine industry can be defeated (e.g., via GPS spoofing that causes the vessel to determine that it is not moving to defeat a geofence). Additionally, when a user is operating a marine vessel, the user may move away from the controls (e.g., to fish, to socialize when the marine vessel is in a station keeping mode, to retrieve an item, etc.), and may leave the marine vessel in an operational state. In such situations, a child may approach the controls and attempt to operate the vessel.

In some embodiments, mechanisms described herein can utilize image data from a camera that has a field of view that includes a control area to determine whether a person attempting to control a marine vessel is an authorized operator. For example, mechanisms described herein can utilize facial recognition, and can permit only pre-authorized operators (e.g., authorized using images of the operator's face provided to the marine vessel) to operate the vessel (which can permit startup and throttle commands). In some embodiments, mechanisms described herein can provide an additional layer of security (e.g., in addition to or in lieu of geofencing, ignition keylocks, etc.) making marine vessels more secure, and which can also mitigate a risk of a child or other unauthorized person from operating the vessel (e.g., changing throttle, steering, adjusting trim, etc.) when an authorized operator is not present.

In some embodiments, mechanisms described herein can utilize image data from one or more cameras of the marine vessel to monitor the marine vessel while the owner is away from the marine vessel. For example, in some embodiments, mechanisms described herein can monitor whether any authorized persons are in or near the marine vessel (e.g., attempting to board the marine vessel, have boarded the marine vessel, etc.). In such an example, mechanisms described herein can alert a user when an unauthorized person is in or near the marine vessel. As another example, in some embodiments, mechanisms described herein can monitor whether the marine vessel has been moved without authorization. In such an example, a marine vessel that is secured (e.g., docked, moored, trailered, etc.) may be moved without authorization of an owner, and mechanisms described herein can analyze image data from one or more cameras to determine a likelihood that the marine vessel has been moved without authorization (e.g., based on a difference between images taken at different times). In a particular example, if a geofence is defeated (or not enabled), mechanisms described herein can use image data to determine whether a marine vessel has been moved.

Figure 1:
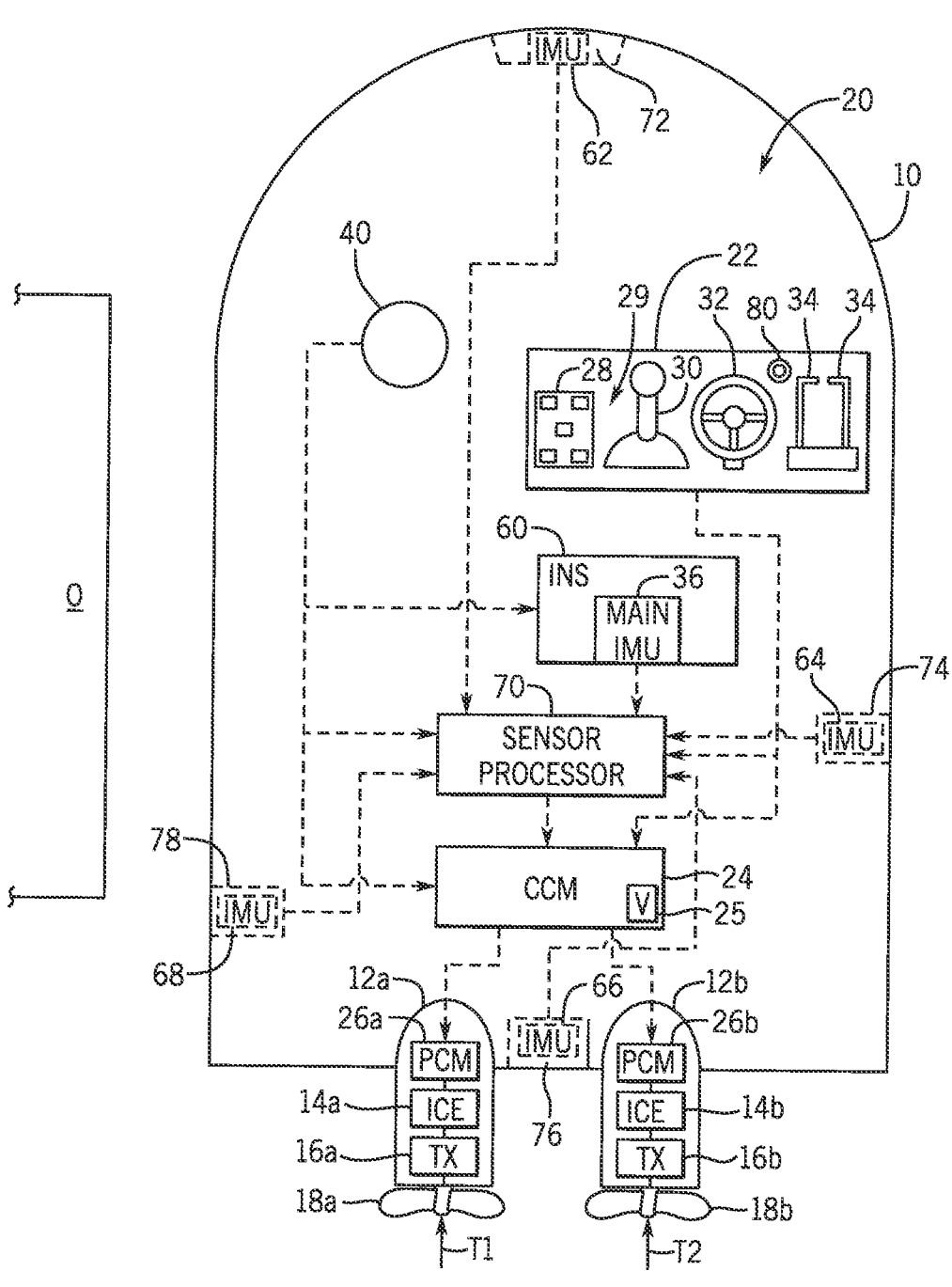
FIG. 1 shows an example of a schematic representation of a propulsion system on a marine vessel in accordance with some embodiments of the disclosed subject matter.

FIG. 1 shows an example of a schematic representation of a propulsion system on a marine vessel in accordance with some embodiments of the disclosed subject matter. FIG. 1 shows a marine vessel 10 equipped with a propulsion system 20 on marine vessel 10 configured in accordance with some embodiments of the disclosed subject matter. In some embodiments, propulsion system 20 can be configured to operate, for example, in a joysticking mode in which a joystick is operated by a user to control vessel movement within an x/y plane, among other modes (e.g., as described hereinbelow). In some embodiments, propulsion system 20 can include first and second propulsion devices 12a, 12b that produce first and second thrusts T1, T2 to propel the vessel 10. First and second propulsion devices 12a, 12b are illustrated as outboard motors, but can alternatively be inboard motors, stern drives, jet drives, pod drives, any other suitable propulsion device, or combinations thereof. Each propulsion device can be provided with an engine 14a, 14b operatively connected to a transmission 16a, 16b, in turn, operatively connected to a propeller 18a. 18b. Note that although propulsion devices 12a, 12b are described as including an engine and transmission, propulsion devices 12a, 12b can include any suitable powerhead, such as an internal combustion engine, an electric motor, or any other device that can be configured to rotate a propulsor (e.g., propellers 18a, 18b) to generate a propulsive force to vessel 10 in addition to, or in lieu of, engines 14a, 14b. Additionally, although two propulsion devices 12, 12b are shown in FIG. 1, a propulsion system, such as propulsion system 20, can include any suitable number of propulsion devices, such as one propulsion device, or more than two propulsion devices.

In some embodiments, vessel 10 can also house various control elements that comprise part of the marine propulsion system 20. For example, marine propulsion system 20 can comprise an operation console 22 in signal communication, for example via a controller area network (CAN) bus (e.g., as described in U.S. Pat. No. 6,273,771), with a controller 24, such as a command control module (CCM), and with propulsion control modules (PCM) 26a, 26b associated with the respective propulsion devices 12a, 12b. Each of controller 24 and the PCMs 26a, 26b can include memory and a programmable processor. Each control module 24, 26a, 26b can include one or more processors communicatively connected to a respective storage system comprising a computer-readable medium that includes volatile and/or nonvolatile memory upon which computer-readable code and data can be stored. Additionally or alternatively, in some embodiments, a processor(s) of one or more of control modules 24, 26a, 26b can be communicatively connected to a shared storage system comprising a computer-readable medium that includes volatile and/or nonvolatile memory upon which computer-readable code and data can be stored. In some embodiments, each processor can access computer-readable code and, upon executing the code, carry out one or more functions, such as collision risk detection when secured, as described in detail below.

In some embodiments, operation console 22 can include any suitable number of user input devices, such as, a keypad 28, a joystick 30, a steering wheel 32, and/or one or more throttle/shift levers 34. Each of these devices can be configured to input commands to controller 24, which can, in turn, communicate control instructions to first and second propulsion devices 12a, 12b by communicating with the PCMs 26a, 26b. In some embodiments, steering wheel 32 and throttle/shift lever(s) 34 can function in a conventional manner, such that rotation of steering wheel 32, for example, activates a transducer that provides a signal to controller 24 regarding a desired direction of the vessel 10. Controller 24 can, in turn, send signals to PCMs 26a, 26b (and/or thrust vector module(s) (TVMs), or additional modules if provided), which in turn can activate steering actuators to achieve desired orientations of the propulsion devices 12a, 12b. In some embodiments, propulsion devices 12a, 12b can be independently steerable about a respective steering axis. Throttle/shift lever(s) 34 can send signals to controller 24 regarding the desired gear (forward, reverse, or neutral) of transmissions 16a, 16b and desired rotational speed of engines 14a, 14b of propulsion devices 12a, 12b. Controller 24 can, in turn, send signals to PCMs 26a, 26b, which in turn activate electromechanical actuators in transmissions 16a, 16b and engines 14a, 14b for shift and throttle, respectively. A manually operable input device, such as joystick 30, can also be used to provide signals to controller 24. In some embodiments, joystick 30 can be used to allow an operator of vessel 10 to manually maneuver vessel 10, such as to achieve lateral translation or rotation of vessel 10. In some embodiments, joystick 30 and/or another joystick that operates using similar principles, can be remote from operation console 22 (e.g., integrated into an armrest of a captain chair, integrated into a secondary operation console, etc.), which can be in signal communication with controller 24, and with any other suitable components, such as PCMs 26a, 26b associated with the respective propulsion devices 12a, 12b.

In some embodiments, propulsion system 20 can also include one or more depth sensors 72, 74, 76, and 78. In some embodiments, depth sensors 72-78 can form a portion of a perception system associated with vessel 10 (note that a perception system is sometimes referred to as a vision system, and may be configured to use visible light sensing modes, and/or other sensing modes, such as sound-based sensing, radio-based sensing, infrared-based sensing, etc.). Although a limited number of depth sensors are shown (e.g., one perpendicular to each of the bow, stern, and port and starboard sides the vessel 10), fewer or more sensors can be provided at each location and/or provided at other locations, such as on a hardtop of the vessel 10. In some embodiments, depth sensors 72-78 can be used to determine a three-dimensional location of an object and/or other feature of an environment (e.g., a water surface) that is within a field of view of the depth sensor with respect to the location of the depth sensor (e.g., distance to various points on an object and a direction associated with each of the various points). For example, depth sensors 72-78 can be implemented using one or more of depth cameras (e.g., implemented using stereoscopic imaging techniques, structured light imaging techniques, continuous-wave time-of-flight imaging techniques, direct time-of-flight imaging techniques, etc.), three-dimensional laser range finders (e.g., implemented using light detection and ranging (lidar) techniques), radars, sonars, and/or other devices individually capable of determining both the distance and direction to points on an object and/or other feature relatively accurately (e.g., on the order of centimeters at relatively close ranges, such as up to several meters, and on the order of a meter at relatively distant ranges, such as upward of 50 m, with accuracy decreasing with distance), e.g., the relative position of various points on an object O (such as a dock, a seawall, a slip, another vessel, a person, a portion of a bridge, a portion of a dam, a relatively large rock, a tree, etc.) with respect to each sensor 72-78 having a field of view that includes object O. In some embodiments, a 3D location of object O and/or various points on object O with respect to vessel 10 can be determined (e.g., by a sensor processor 70) using the location of object O and/or various points on object O determined by one or more of depth sensors 72-78. In some embodiments, a calibration process can be performed to determine a set of transforms that can be used to convert a location from a local coordinate system used by a particular depth sensor to the corresponding location in a global coordinate system used by vessel 10 (e.g., used to perform autonomous navigation processes, such as automatically guiding vessel 10 during docking).

In some embodiments, a global coordinate system (sometimes referred to as global coordinates or world coordinates) can be defined relative to a particular point on vessel 10. For example, locations of points in an environment of vessel 10 can be defined based on the distance from a predetermined point, such as center of gravity (COG) or center of rotation (COR) of vessel 10. In some embodiments, the global coordinate system can use any suitable type of coordinate system, such as a 3D Cartesian coordinate system, a spherical coordinate system, a cylindrical coordinate system, etc.

In some embodiments, sensors 72-78 can determine and/ or provide information regarding a location of an object in camera coordinates and using any suitable format (e.g., providing information using a depth image(s) such as an RGBD image, or using a point cloud in any suitable file format). Additionally or alternatively, in some embodiments, sensors 72-78 can determine and/or provide information regarding a location of an object in global coordinates (e.g., using a transform between camera coordinates and global coordinates identified during a calibration procedure) and using any suitable format (e.g., providing information using a depth image(s) such as an RGBD image, or using a point cloud in any suitable file format). In some embodiments, sensors 72-78 can provide position information for various points within that sensors FOV to one or more controllers, such as to sensor processor 70 and/or controller 24 via any suitable communication network, such as by way of a dedicated bus connecting the sensors to a controller, a CAN bus, or wireless network link(s), as described below. In some embodiments, given the large amount of depth data produced by depth sensors 72-78, the connection between sensors 72-78 and the sensor processor 70 can be via a dedicated bus or network connection. Such a dedicated bus or network connection can be separate from the vessel network (e.g., including a CAN bus) in order to facilitate transmission of a large amount of depth measurement data (and, in some embodiments, IMU data) to sensor processor 70. Such massive data transmission may not be possible on a typical vessel network, such as a CAN bus or wireless network where multiple devices are communicating. In some embodiments, sensor processor 70 can be configured to communicate filtered data on the vessel network, such as a CAN bus or wireless network. Additionally or alternatively, a dedicated communication link can be provided between sensor processor 70 and a propulsion controller, such as central controller 24.

In some embodiments, sensors 72-78 can include different types of sensors (e.g., depending on the distance between vessel 10 and an object, such as object O). For example, radar sensors can be used to detect objects at further distances, and cameras, sonic sensors, and/or lidar can be used to for objects at closer distances. Note that depth camera sensors can be used, alone or in combination with any of the sensors described above, for example, to provide object location information to controller 24. Sensors 72-78 can be placed at positions on vessel 10 so that the sensor is at a height and facing a direction suitable to detect objects that vessel 10 is likely to encounter. Additionally, sensors 72-78 (and/or additional sensors) can be placed to have at least partially overlapping fields of view. Note that optimal sensor positions can vary depending on vessel size and configuration.

In some embodiments, propulsion system 20 can also include one or more cameras 80 configured to have a field of view that can be used to monitor an area from which operation console 22 can be operated. In some embodiments, camera 80 can form a portion of a perception system associated with vessel 10. Although a single camera 80 is shown (e.g., with a field of view associated with operation console 22), fewer or more cameras can be provided at each location of a camera and/or provided at other locations, such as a remote operational console of vessel 10. In some embodiments, camera 80 can be used to monitor an operator of vessel 10 and/or an identify of one or more occupants of vessel 10, based on facial features within a field of view of camera 80. In some embodiments, camera 80 can be implemented using a conventional two-dimensional visible light camera (e.g., implemented using a CMOS or CCD sensor), a depth camera, non-visible light camera (e.g., infrared camera), any other suitable technology, or any suitable combinations thereof. In some embodiments, camera 80 can be implemented with wide field of view (e.g., using a wide-angle lens, an ultra-wide angle lens, a fisheye lens, etc.) and sufficient resolution to capture image data that can be used to perform facial recognition (at least in an area near operational console 20). In some embodiments, camera 80 can be integrated into a portion of vessel 10. For example, camera 80 can be integrated into operation console 20. As another example, camera 80 can be integrated into a hard top of vessel 10, an A-pillar of vessel 10, etc. In some embodiments, one or more additional cameras (e.g., similar to camera 80) can be positioned at other portions of vessel 10, such as at a remote operation console (e.g., having a joystick similar to joystick 30).

In FIG. 1, the depth sensors shown are positioned to observe multiple regions around vessel 10, including the front, sides, and stern of vessel 10, and include a front-facing sensor 72, a starboard-facing sensor 74, a rear-facing sensor 76, and a port-facing sensor 78. In some embodiments, one or more depth sensors can be placed on a hard top of marine vessel 10 and arranged such that the fields of view of the one or more depth sensors, combined, cover the entire 360° area surrounding vessel 10 (although there may be blind spots relatively close to vessel 10 (e.g., where the hull obstructs the field of view). Note also that the relevant controller, such as sensor processor 70, can selectively operate any one or more of a plurality of sensors (e.g., including depth cameras, radars, lidars, ultrasonics, or any other suitable sensor technology) to sense the location of objects in an environment of vessel 10. Note that the global coordinate system can be independent and distinct from a geographical coordinate system of latitude and longitude often used to designate locations on Earth.

In some embodiments, sensor processor 70 can integrate sensor data provided from one or more types of sensor (e.g., depth sensors 72-78, camera 80, etc.) into one or more models of an environment of vessel 10, objects within the environment, and/or vessel 10 itself. In such embodiments, the model(s) can be in any suitable format, such as one or more point clouds, one or more maps, and/or one or more occupancy grids integrating location information from multiple sensors. As described above, the location data from different sensors can be translated into a common reference frame (e.g., defined by the global coordinate system). In some embodiments, such a model can be used to implement autonomous and/or advanced operator assistance (sometimes referred to as semi-autonomous) controls.

In some embodiments, vessel 10 can have a main inertial measurement unit (IMU) installed at a known location on the marine vessel. Referencing the example in FIG. 1, main IMU 36 can be part of an inertial navigation system (INS) such as including one or more micro-electro-mechanical systems (MEMS). For example, INS 60 can include a MEMS angular rate sensor, such as a rate gyro, a MEMS accelerometer, and a magnetometer. Such INS systems are well known in the relevant art. Additionally or alternatively, in some embodiments, motion and angular position (including pitch, roll, and yaw) can be sensed by a differently configured INS 60, or by an attitude heading reference system (AHRS) that provides 3D orientation of vessel 10 by integrating gyroscopic measurements, accelerometer data, and magnetometer data. In some embodiments, INS 60 can receive orientation information from main IMU 36 and can also receive information from a GPS receiver 40 comprising part of a satellite-based radio navigation system, such as the global positioning system (GPS). GPS receiver 40 can be located at a pre-selected fixed position on vessel 10, which provides information related to a position of vessel 10 with respect to a planetary frame of reference (e.g., latitude, longitude, and height with respect to sea level). In some embodiments, main IMU 36 can also be located at a known and fixed position with respect to the center of rotation (COR) and/or center of gravity (COG) of vessel 10 (e.g., a COG when the vessel is empty).

In some embodiments, IMU data from each sensor IMU 62-68 and/or main IMU 36 can be provided to sensor processor 70 and/or to another controller (e.g., CCM 24, INS 60, etc.). For example, the IMU data from each sensor IMU 62-68 can be transmitted along with the feature location information from the respective depth sensor 72-78. Additionally or alternatively, in some embodiments, each sensor IMU 62-68 can have an integrated microprocessor configured to process the respective sensor IMU data and compare the sensor IMU data to main IMU data and determine whether the sensor IMU data is inconsistent with the main IMU data based on the relative location of the sensor IMU with respect to main IMU 36. In some embodiments, as shown in FIG. 1, object location data and/or IMU data can be communicated to sensor processor 70 (and/or any other suitable controller), which can be via any suitable wired or wireless communication technique(s), such as via a dedicated communication bus, wireless transmission protocols (e.g. Bluetooth, Bluetooth Low Energy, ZigBee, etc.), a CAN bus comprising part of the vessel network, etc. Note that the dashed lines in FIG. 1 are meant to show only that the various control elements are capable of communicating with one another, and do not necessarily represent actual wiring connections between the control elements, nor do they represent the only possible paths of communication between the elements. In some embodiments, one or more depth sensors 72-78 and/or one or more sensor IMUs 62-68 can be omitted (e.g., in embodiments in which autonomous navigation features are not implemented).

In some embodiments, some sensor processing functions can be performed by a separate computing device. For example, sensor processor 70 can communicate processed sensor data to central controller 24, which can utilize the processed data for navigation functions and/or other vessel control functions. In some embodiments, sensor processor 70 can be a dedicated, special-purpose computing system configured to process image data (e.g., for facial recognition), object location data, and/or IMU data from camera 80, depth sensors 72-78, sensor IMUs 62-68, and/or main IMU 36. As described below, in some embodiments, sensor processor 70 can be associated with its own storage system comprising memory and its own processing system that executes programs and accesses data stored in the memory of sensor processor 70. Additionally or alternatively, in some embodiments, one or more functions described as being performed by sensor processor 70 can be incorporated in a multi-purpose controller, such as sensor processor software stored and executed within controller 24. For example, in some embodiments, controller 24 can control marine vessel navigation, such as autonomous point-to-point navigation, automatic docking, or other advanced operator assistance programs. In some embodiments, central controller 24 can also perform one or more sensor processing functions. Additionally or alternatively, in some embodiments, functions described herein as comprising part of the sensor processor functions can be distributed across two or more processing devices. For example, each camera 80 and/or sensor 72-78 can each include one or more processors that are configured to perform certain functions (e.g., facial recognition, segmenting image data to classify one or more objects in the image, generate one or more RGBD images, generate one or more 3D depth maps, generate a point cloud corresponding to the 3D depth map, project points into a global coordinate system). As another example, each IMU 62-68 can include (or otherwise be associated with) one or more processors that are configured to perform calculations to interpret measured IMU data (such as to determine an attitude estimate for the respective IMU, to determine whether the sensor IMU data is inconsistent with main IMU data, etc.) and provide the interpreted IMU data to one or more other processing devices or controllers for execution of subsequent processing steps.

In some embodiments, camera 80 can be used to generate data that can be used to monitor security of vessel 10 (e.g., when moored, docked, trailered, etc.), and/or safety of vessel 10 (e.g., when being actively operated). In some embodiments, depth sensors 72-78 can be used to generate data that can be used for autonomous navigation (e.g., path planning, collision avoidance, station keeping, etc.) while marine vessel 10 is being operated, and/or to monitor the security and/or safety of vessel 10 (e.g., in addition to, or in lieu of, camera 80, if one or more of depth sensors 72-78 include an area associated with an operation console in its field of view). In some embodiments, sensor processor 70 can be programmed (and/or otherwise configured) to: automatically perform a process for security and safety monitoring of marine vessel 10; perform a process for regulating control of marine vessel 10 while marine vessel 10 is being actively operated; perform a process for monitoring security of an inactive marine vessel using image data generated by a vision system of the marine vessel; and/or perform a process for determining whether to capture image data using a vision system of an inactive marine vessel.

Figure 2:
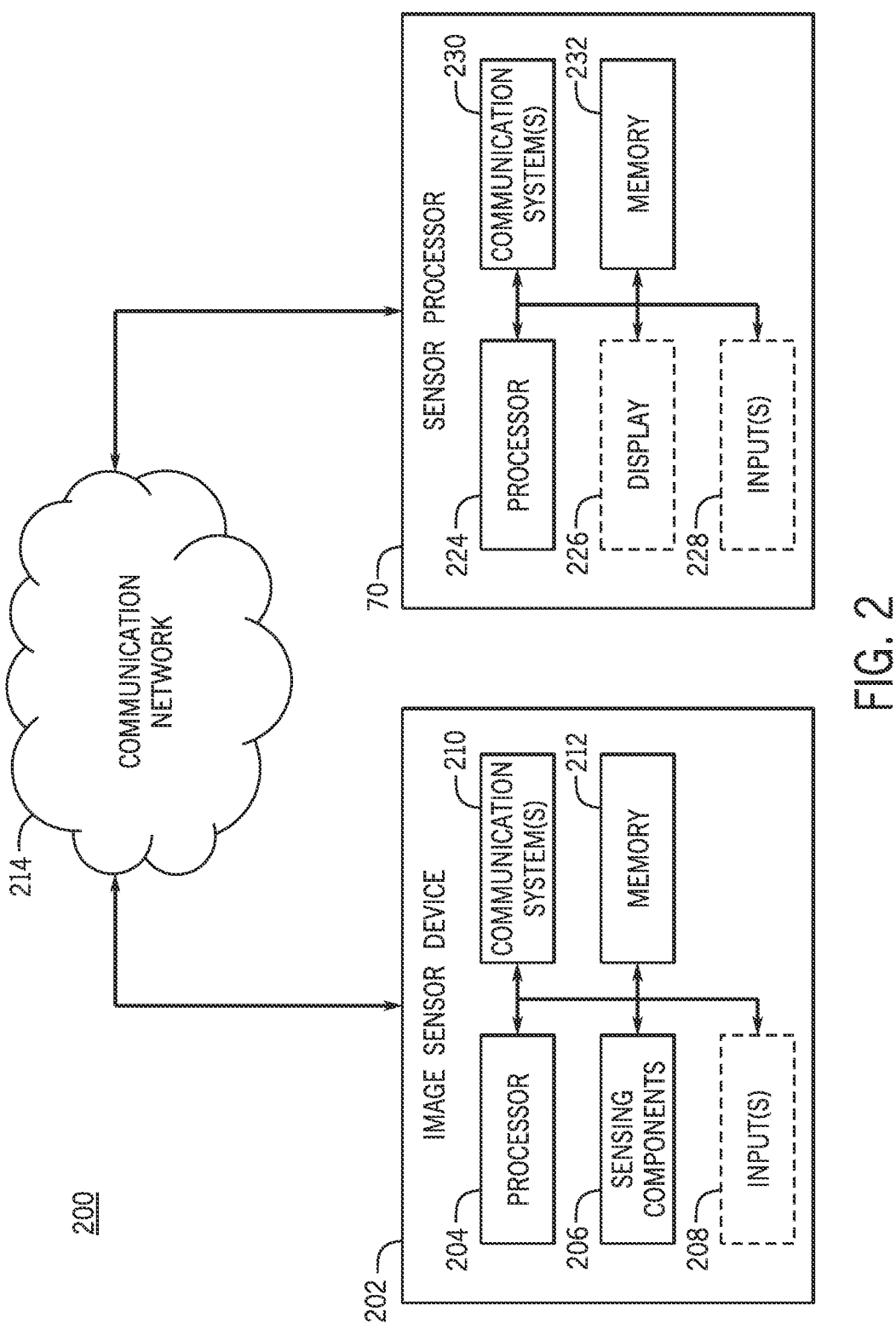
FIG. 2 shows an example of hardware that can be used to implement a sensor device and sensor processor in accordance with some embodiments of the disclosed subject matter.

FIG. 2 shows an example of hardware 200 that can be used to implement a depth sensor device 202 and sensor processor 70 in accordance with some embodiments of the disclosed subject matter.

As shown in FIG. 2, in some embodiments, image sensor device 202 can include a processor 204, sensing components 206, one or more inputs 208, one or more communication systems 210, and/or memory 212. In some embodiments, processor 204 can be any suitable hardware processor or combination of processors, such as a central processing unit (CPU), an accelerated processing unit (APU), a graphics processing unit (GPU), a field programmable gate array (FPGA), an application specific integrated circuit (ASIC), etc.

In some embodiments, sensing components can include components that are used to capture image data of a scene (e.g., including a face) that is within a field of view of image sensor device 202. In some embodiments, image sensor device 202 can include components used to implement one or more cameras 80 and/or one or more of depth sensors 72-78. Additionally or alternatively, in some embodiments, sensing components can include components that are used to determine a three-dimensional location of an object and/or other feature of an environment (e.g., a water surface) that is within a field of view of image sensor device 202. In some embodiments, image sensor device 202 can include components used to implement one or more cameras 80 and/or one or more of depth sensors 72-78.

For example, image sensor device 202 can be implemented as one or more cameras that include components that facilitate two-dimensional imaging of a region of an environment, such as a digital camera. As another example, image sensor device 202 can be implemented as one or more cameras that include components that facilitate three-dimensional imaging of a region of an environment, such as a stereoscopic camera, a structured light camera, a continuous-wave time-of-flight camera, a direct time-of-flight camera, etc. As another example, image sensor device 202 can be implemented as one or more lidar devices (e.g., a scanning lidar, a lidar including a 2D array sensor, etc.) that include components that facilitate three-dimensional characterization of a region of an environment.

In some embodiments, inputs 208 can include any suitable input devices and/or sensors that can be used to receive user input, such as a keyboard, a mouse, a touchscreen, a touchpad, a microphone, a camera, etc. In some embodiments, image sensor device 202 can omit inputs (e.g., where image sensor device 202 is an embedded device, or where image sensor device 202 is not configured for direct end user operation).

In some embodiments, communications systems 210 can include any suitable hardware, firmware, and/or software for communicating information over a communication network 214 and/or any other suitable communication networks. For example, communications systems 210 can include one or more transceivers, one or more communication chips and/or chip sets, etc., that can be used to establish a wired and/or wireless communication link. In a more particular example, communications systems 210 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc.

In some embodiments, memory 212 can include any suitable storage device or devices that can be used to store instructions, values, etc., that can be used, for example, by processor 204 to generate image data of a portion of the environment that characterizes the portion of the environment in two dimensions, to identify and/or classify one or more objects and/or other features in a scene based on the location information and/or image data, to perform facial recognition and/or verification, to communicate with sensor processor 70 via communications system(s) 210, etc. Additionally, in some embodiments, memory 212 can include any suitable storage device or devices that can be used to store instructions, values, etc., that can be used, for example, by processor 204 to generate location information of a portion of the environment that characterizes the portion of the environment in three-dimensions, to identify and/or classify one or more objects and/or other features in a scene based on the location information and/or image information, etc.

Memory 212 can include any suitable volatile memory, non-volatile memory, storage, or any suitable combination thereof. For example, memory 212 can include random access memory (RAM), read-only memory (ROM), electronically erasable programmable read-only memory (EEPROM), one or more flash drives, one or more hard disks, one or more solid state drives, one or more optical drives, etc. In some embodiments, memory 212 can have encoded thereon a computer program for controlling operation of image sensor device 202. In such embodiments, processor 204 can execute at least a portion of the computer program to generate image data of a portion of the environment that characterizes the portion of the environment in two dimensions, to identify and/or classify one or more objects and/or other features in a scene based on the location information and/or image data, to perform facial recognition and/or verification, to communicate with sensor processor 70 via communications system(s) 210, to generate location information, to identify and/or classify one or more objects and/or other features in a scene based on the location information and/or image information, to execute at least a portion of a process for security and safety monitoring of marine vessel 10; a process for regulating control of marine vessel 10 while marine vessel 10 is being actively operated; a process for monitoring security of an inactive marine vessel using image data generated by a vision system of the marine vessel; and/or a process for determining whether to capture image data using a vision system of an inactive marine vessel; such as processes described below in connection with FIGS. 3-6, etc.

In some embodiments, image sensor device 202 can include any suitable display device(s) (not shown), such as a computer monitor, a touchscreen, a television, etc. In some embodiments, image sensor device 202 can omit a display (e.g., where image sensor device 202 is an embedded device, or where image sensor device 202 is not configured for direct end user operation).

In some embodiments, communication network 214 can be any suitable communication network or combination of communication networks. For example, communication network 214 can include a Wi-Fi network (which can include one or more wireless routers, one or more switches, and the like), a peer-to-peer network (e.g., a Bluetooth network), a cellular network (e.g., a 3G network, a 4G network, a 5G network, etc., complying with any suitable standard(s), such as CDMA, GSM, LTE, LTE Advanced, 5G NR, etc.), a wired network, etc. In some embodiments, communication network 214 can include one or more portions of a control area network (CAN), a local area network (LAN), a wide area network (WAN), a public network (e.g., the Internet, which may be part of a WAN and/or LAN), any other suitable type of network, or any suitable combination of networks. Communications links shown in FIG. 2 can each be any suitable communications link or combination of communications links, such as wired links, fiber optic links, Wi-Fi links, Bluetooth links, cellular links, etc.

In some embodiments, sensor processor 70 can include a processor 224, a display 226, one or more inputs 228, one or more communications systems 230, and/or memory 232. In some embodiments, processor 224 can be any suitable hardware processor or combination of processors, such as a CPU, an APU, a GPU, an FPGA, an ASIC, etc. In some embodiments, display 226 can include any suitable display devices, such as a computer monitor, a touchscreen, a television, etc. Note that in some embodiments, display 226 can be a display that is useable to present information generated by sensor processor 70, such as a multi-function display (MFD) of vessel 10, which may not be integrated with sensor processor 70. In some embodiments, inputs 228 can include any suitable input devices and/or sensors that can be used to receive user input, such as a keyboard, a mouse, a touchscreen, a microphone, etc. Note that in some embodiments, inputs 228 can be inputs of vessel 10 useable to provide input to sensor processor 70, which may not be integrated with sensor processor 70. In some embodiments, sensor processor 70 can omit inputs (e.g., where sensor processor 70 is an embedded device that is not configured for direct user interaction). For example, sensor processor 70 can provide results of an analysis to CCM 24, and CCM 24 can use the results to assist with security and/or safety monitoring, autonomous control, and/or advanced operator assistance control.

Additionally, in some embodiments, vessel 10 can include one or more additional outputs (e.g., indicator lights, speakers, displays, etc.), which can be included in sensor processor 70, or which may be integrated into another device (e.g., an MFD, an entertainment and/or voice communication system, etc.).

In some embodiments, communications systems 230 can include any suitable hardware, firmware, and/or software for communicating information over communication network 214 and/or any other suitable communication networks. For example, communications systems 230 can include one or more transceivers, one or more communication chips and/or chip sets, etc., that can be used to establish a wired and/or wireless communication link. In a more particular example, communications systems 230 can include hardware, firmware, and/or software that can be used to establish a direct or indirect wired connection and/or a direct or indirect wireless connection, such as a CAN bus connection, a Bluetooth connection, Bluetooth Low Energy connection, a ZigBee connection, a Wi-Fi connection, a cellular connection (e.g., an uplink connection, a downlink connection, or a sidelink connection), an Ethernet connection, etc. Note that in some embodiments, a portion of communications system 230 can be a communication system that is useable to transmit information generated by sensor processor 70, such as a communication system of vessel 10, which may not be integrated with sensor processor 70. Additionally, in some embodiments, vessel 10 can include one or more communication systems (e.g., a wireless and/or wired communication system) which can be integrated with sensor processor 70, or which may be integrated with another device (e.g., a communication system in communication with CCM 24, etc.). For example, sensor processor 70 can provide data to CCM 24, and CCM 24 can use the data to transmit information to a remote device (e.g., a mobile computing device associated with a user) in connection with security and/or safety monitoring.

In some embodiments, memory 232 can include any suitable storage device or devices that can be used to store instructions, values, etc., that can be used, for example, by processor 224 to analyze image data of a portion of the environment received from image sensor device 202 that characterizes the portion of the environment in two dimensions, to identify and/or classify one or more objects and/or other features in a scene based on the location information and/or image data, to perform facial recognition and/or verification, to communicate with to communicate with image sensor device 202 via communications system(s) 230, etc. Memory 232 can include any suitable volatile memory, non-volatile memory, storage, or any suitable combination thereof. For example, memory 232 can include RAM, ROM, EEPROM, one or more flash drives, one or more hard disks, one or more solid state drives, one or more optical drives, and the like. In some embodiments, memory 232 can have encoded thereon a computer program for controlling operation of sensor processor 70. In such embodiments, processor 224 can execute at least a portion of the computer program to receive image data of a portion of the environment that characterizes the portion of the environment in two dimensions, to identify and/or classify one or more objects and/or other features in a scene based on the location information and/or image data, to perform facial recognition and/or verification, to communicate with image sensor device 202 via communications system(s) 230, analyze object location information, to identify and/or classify one or more objects and/or other features in a scene based on the object location information and/or image information, to execute at least a portion of a process for security and safety monitoring of marine vessel 10; a process for regulating control of marine vessel 10 while marine vessel 10 is being actively operated; a process for monitoring security of an inactive marine vessel using image data generated by a vision system of the marine vessel; and/or a process for determining whether to capture image data using a vision system of an inactive marine vessel; such as processes described below in connection with FIGS. 3-6, etc.

Figure 3:
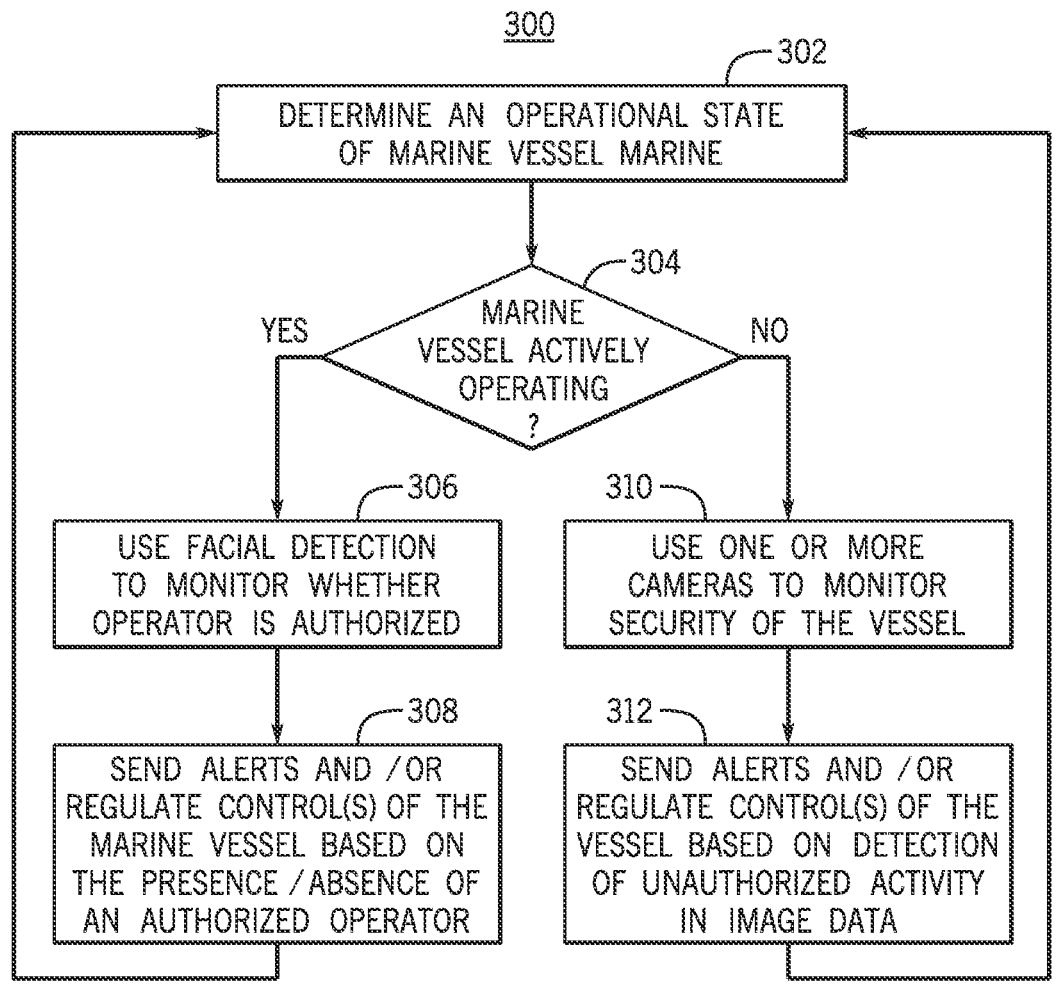
FIG. 3 shows an example of a process for security and safety monitoring of a marine vessel using a vision system of the marine vessel in accordance with some embodiments of the disclosed subject matter.

FIG. 3 shows an example of a process 300 for security and safety monitoring of a marine vessel using a vision system of the marine vessel in accordance with some embodiments of the disclosed subject matter.

At 302, process 300 can determine an operation state of the marine vessel. In some embodiments, process 300 can use any suitable technique or combination of techniques to determine an operational state of the marine vessel. For example, process 300 can determine that the marine vessel is being actively operated if an ignition of the marine vessel is in an "ON" or "START" position. As another example, for some internal combustion outboard-equipped vessels, a battery voltage can be monitored to detect if the outboard has been started. In a more particular example, battery voltages above a threshold (e.g., above 13.2V for lead-acid chemistry in a 12V battery system) can indicate a system with an alternator or a DC-DC converter actively charging the battery, which can be expected to occur after the system is active (e.g., awake). As yet another example, for some vessels that utilize electrical motors for propulsion, a voltage of a 12V battery (e.g., used to power devices other than a motor) can be monitored (e.g., higher voltage can indicate that the 12V battery is being charged), a state of a system wake signal can be monitored, a presence of particular communications network activity (e.g., activity on a CAN) can indicate that the vessel is active, etc. As another example, process 300 can determine that the marine vessel is not being actively operated if an ignition of the marine vessel is in an "OFF," "ACC" or other position in which the marine vessel is not configured to move under power.

In some embodiments, an operational state of the marine vessel can be based on whether the marine vessel can be actively controlled in the current operational state. For example, a state in which the marine vessel is configured to respond to operational commands that cause movement of the marine vessel and/or a steering component of the marine vessel (e.g., in response to input provided via keypad 28, joystick 30, steering wheel 32, throttle/shift lever 34, etc.) can be an actively operated state, and a state in which the marine vessel is configured to not respond to operational commands that cause movement of the marine vessel and/or a steering component of the marine vessel can be another state that is not an actively operated state. As another example, a state in which one or more propulsion devices of the marine vessel are operational and/or in which operation of one or more propulsion devices of the marine vessel are initiated can be an actively operated state.

In some embodiments, process 300 can determine that the marine vessel is not being actively operated if process 300 determines that the marine vessel is secured in some fashion (e.g., via an anchor, mooring ball, slip, dock, trailer, boat lift, etc.). In some embodiments, process 300 can use any suitable technique or combination of techniques to determine whether the marine vessel is secured. A marine vessel can be secured using a variety of techniques, and can be secured in various ways. For example, a marine vessel can be secured if the marine vessel is secured to a dock or mooring ball (e.g., the vessel can be docked or moored). As another example, a marine vessel can be secured if an anchor of the marine vessel has been deployed (e.g., the vessel can be anchored). As yet another example, a marine vessel can be secured if the marine vessel is removed from water (e.g., via a trailer, a boat lift, a dry dock, if the vessel is beached, etc.). As still another example, a vessel can be secured if it is tied up to any suitable structure. In some embodiments, a marine vessel that is not being actively operated can be in a secured state in which movement of the vessel is constrained, or in an unsecured state in which movement of the vessel is not constrained (e.g., the vessel can be adrift). Note that this can be distinguished from when the vessel is being operated and it may be placed into a state in which the vessel autonomously maintains a relatively consistent location (e.g., a station keeping mode). In such a state, propulsion devices and/or other devices of the vessel can be operated (e.g., by a user, by a controller, etc.) to maintain a relatively fixed position.

In some embodiments, process 300 can determine that the vessel is secured and/or not being actively operated based on input from a user (e.g., via a hardware-based user interface element, via a software-based user interface element presented via a touchscreen such as an MFD, via a mobile device such as a smartphone or tablet computer, etc.). For example, input can be received (e.g., via a device onboard the vessel, via a mobile device associated with a user of the vessel such as a smartphone that has been paired with the vessel) indicating that the vessel is to enter a docked state, a moored state, a trailered state, etc. As another example, input can be received indicating that the vessel has been docked, moored, trailered, or otherwise secured. As yet another example, input can be received (e.g., via a device onboard the vessel, via a mobile device associated with a user of the vessel such as a smartphone that has been paired with the vessel) indicating that the vessel is to enter a secured state (e.g., in which the vessel is configured to lock out helm controls until unlocked via a particular device is detected and/or input is received). In some embodiments, a user can provide input indicating how the vessel is secured (e.g., to a mooring ball, to a dock, via an anchor, via a trailer, via a boat lift, etc.).

Additionally or alternatively, in some embodiments, process 300 can determine whether the marine vessel is secured based on data generated by one or more sensors, such as depth sensor devices, cameras, and/or other input devices (e.g., a GPS receiver, one or more IMUs, a motor and/or sensor associated with deploying an anchor such as via a windlass, etc.), when the vessel is not being actively operated (e.g., by a user and/or by a controller) and/or has likely been secured (e.g., by deploying an anchor via an automated or manual windlass associated with a sensor in communication with a controller).

In some embodiments, process 300 can determine whether the marine vessel has been trailered (e.g., removed from water and stored, e.g., via a trailer, boat lift, etc.) based on motion data (e.g., received from an IMU(s)). For example, process 300 can receive motion data (e.g., main IMU 36, and/or IMUs 68) periodically (e.g., at regular and/or irregular intervals). If an amount of motion indicated in the motion data is below a threshold for a predetermined amount of time (e.g., 1 hour, 6 hours, 1 day, etc.), process 300 can determine that the marine vessel has been removed from water (e.g., is trailered, which may or may not involve the marine vessel being placed on a trailer), as a marine vessel in water can be expected to move regularly. Additionally or alternatively, in some embodiments, process 300 can determine whether the marine vessel has been trailered (e.g., removed from water and stored, e.g., via a trailer, boat lift, etc.) based on input received from a user (e.g., via a user interface of the marine vessel, via an application executed by a mobile computing device associated with the marine vessel, etc.).

In some embodiments, process 300 can monitor security and/or safety of the marine vessel based on various settings, which can be specified and/or adjusted by a user. For example, security and/or safety monitoring using one or more cameras to detect faces, movement, etc., can be enabled by a user (e.g., via a user interface presented using a device of the marine vessel, such as an MFD, or via a user interface presented using an application executed by a mobile computing device associated with the marine vessel). In such an example, the user interface can present and/or otherwise specify settings associated with security and/or safety monitoring, and/or can facilitate specifying and/or adjusting settings associated with security and/or safety monitoring.

In some embodiments, a user can specify and/or adjust whether and when facial is permitted to be used for security and/or safety monitoring. For example, a user can specify that facial recognition is not permitted. As another example, a user can specify that facial recognition is permitted only when the vessel is stationary or otherwise not being actively operated. As yet another example, a user can specify that facial recognition is permitted when the vessel is unoccupied (e.g., when the vessel is secured and no authorized occupants are present). As still another example, a user can specify that facial recognition is permitted only when the vessel is being actively operated. As a further example, a user can specify that facial recognition is permitted when the vessel is being actively operated, and when the vessel is not being actively operated. In some embodiments, an initial setting can be specified (e.g., as a default setting) without user intervention, and the initial setting can be adjustable by a user. For example, a default setting can be no use of cameras for security and/or safety monitoring, use of facial recognition for safety monitoring when the marine vessel is being actively operated, use of facial recognition and/or image analysis for security monitoring when the marine vessel is not being actively operated, or use of image data for security and safety monitoring when the marine vessel is being actively operated and when the marine vessel is not being actively operated. In some embodiments, a user (e.g., an authorized user) can be prompted to acknowledge the default setting and/or a current setting before operating the marine vessel (e.g., a first time, every time, when the setting has changed, etc.).

In some embodiments, a user can specify and/or adjust one or more preferred techniques for providing an alert to a user. For example, a user can specify that email is a preferred technique for providing alerts. In such an example, the user can be prompted to provide and/or confirm an email address to which alerts are to be sent (e.g., a single email address, or multiple email addresses). As another example, a user can specify that a cellular message (e.g., a short message service (SMS) message, a rich communication services (RCS) message, etc.) is a preferred technique for providing alerts. In such an example, the user can be prompted to provide and/or confirm a phone number to which alerts are to be sent (e.g., a single phone number, or phone numbers). As yet another example, a user can specify that a message via an application (e.g., a message via a messaging application, such as an instant messaging service application; a message via an application useable to monitor and/or control one or more components of the marine vessel; a push notification via an application useable to monitor and/or control one or more components of the marine vessel, etc.) is a preferred technique for providing alerts. In such an example, the user can be prompted to provide and/or confirm a user identification (e.g., a user ID, which can be a string of characters, a phone number, an email address, etc.) to which alerts are to be sent (e.g., a single user ID, or multiple user IDs), and/or an application(s) to be used to send alerts (e.g., a single application or multiple applications). In some embodiments, a user can specify that alerts are to be provided via multiple techniques and/or sent to multiple destinations (e.g., which may be associated with different users via the same channel, such as email, text message, instant message, push notification, etc.). In some embodiments, a user can specify that different types of alerts be provided via different channels. In some embodiments, an initial setting can be specified (e.g., as a default setting) without user intervention, and the initial setting can be adjustable by a user. For example, a default setting can be to provide alerts using an application useable to monitor and/or control one or more components of the marine vessel, or via an email address and/or phone number that has been provided by a user.

In some embodiments, a user can be permitted to specify a time interval at which security is to be monitored when the marine vessel is not being actively operated and a reliable power source is not available (e.g., shore power, a battery state-of-charge (SOC) over a threshold, an adequate auxiliary power source that is providing power such as a generator, a solar panel(s), etc.). For example, a user can specify whether to monitor security of the vessel once every 8 hours, once every 24 hours, once every 48 hours, once every 72 hours, etc. Such a value can be set as a parameter (e.g., an

[off_timeout] parameter) that can be used to determine how often to capture image data while the vessel is not actively being operated.

In some embodiments, a user can be permitted to specify a time interval at which security is to be monitored when the marine vessel is not being actively operated and a reliable power source is available (e.g., shore power, a battery state-of-charge (SOC) over a threshold, an adequate auxiliary power source that is providing power such as a generator, a solar panel(s), etc.). For example, a user can specify whether to monitor security of the marine vessel substantially continuously (e.g., at an interval at which the vessel is monitored while being actively operated), once per minute, once per hour, etc. In some embodiments, a single image can be captured after a time interval has elapsed, or multiple images can be captured after the time interval has elapsed, which can be used to detect relatively fast interframe motions that may not be apparent in an analysis using a previous image captured before the time period elapsed.

In some embodiments, a user can be permitted and/or prompted to select a region of interest to be monitored when monitoring security and/or safety of the marine vessel. For example, a user can be prompted to select a region(s) of interest in an image that is least likely to change when the vessel is secured (e.g., docked, moored, trailed, etc.). In such an example, a user can select a portion of an image(s) (e.g., presented via an MFD of the marine vessel, via an application executed by a mobile device associated with the user and/or the marine vessel, etc.) that corresponds to an object that is expected to remain relatively static while the vessel is secured (e.g., a mooring ball; a dock; a building; a landscape feature; a machine readable code, such as a barcode, QR code, etc.; etc.). In some embodiments, process 300 can use visual information in the selected region when monitoring the security of the marine vessel. In some embodiments, the region(s) of interest can be in an image captured by camera 80, and/or in an image captured by a depth sensor(s), such as depth sensors 72-78. As another example, a user can be prompted to select a region(s) of interest in an image that is likely to include an operator of the marine vessel when the marine vessel is being actively operated.

In some embodiments, a user can be permitted and/or prompted to select a device(s) to use to trigger more active security monitoring when the marine vessel is not being actively operated. For example, a user can indicate that motion data (e.g., from one or more IMUs) can be used to trigger more active (e.g., more frequent) monitoring via one or more cameras. In such an example, if movement over a threshold is detected, it can trigger more frequent imaging and/or analysis (e.g., facial recognition). As another example, a user can indicate that image data (e.g., from one or more cameras, such as camera 80 and/or one or more of depth sensors 72-78) can be used to trigger more active (e.g., more frequent) monitoring via one or more cameras. In such an example, if a face is detected in an image, it can trigger more frequent imaging and/or analysis (e.g., facial recognition).

In some embodiments, a user can be prompted to provide image data that can be used to identify one or more authorized operators, and/or one or more unauthorized operators. For example, a user can be prompted to provide an image that includes a clear picture of a person's face (e.g., uploaded from memory of a computing device, such a mobile computing device; captured using a camera of a computing device, such a mobile computing device; captured using a camera of the marine vessel, such as camera

80, etc.). In some embodiments, a user can be prompted to provide image data that depicts any people that are authorized operators (e.g., people, potentially including the user providing the image data) that are permitted to actively operate the marine vessel. In some embodiments, a user can indicate whether a person depicted in particular image data is authorized to operate the marine vessel and/or a time(s) when the person is authorized to operate the marine vessel. For example, a user can provide image data depicting one or more children, and can indicate that the person in the image data is not authorized to operate the marine vessel, is only authorized to operate the marine vessel in an emergency (e.g., if an authorized operator falls overboard or otherwise becomes incapacitated), of is restricted to operating the marine vessel below a particular speed and only when the marine vessel is already in an operational state (e.g., which may permit the person to operate the vessel in an emergency situation). As another example, a user can indicate that a particular person is authorized to operate the marine vessel any time, while another person is only permitted to operate the marine vessel for a particular period of time (e.g., when the marine vessel is being rented or loaned to that person).

In some embodiments, a user can be permitted and/or prompted to select a timeout period to be used when the vessel is being actively operated. The timeout period can indicate a period of time that the marine vessel is permitted to continue operating without an authorized operator being present at an operation console (e.g., using facial recognition to determine whether an authorized operator is present). For example, the user can specify a timeout of ten seconds(s), 30 s, one minute, five minutes, 10 minutes, etc. that the marine vessel is permitted to continue operating without an authorized operator present without taking any actions. In some embodiments, a user can be permitted to specify different timeout periods for different situations. For example, a user can select a first timeout period while the vessel is in gear and/or moving more than a predetermined speed (e.g., 10 s, 30 s, one minute, five minutes, etc.). As another example, user can select a different timeout period to use while the vessel is being actively operated (e.g., is "ON") but is not in gear (e.g., is in neutral) and/or is engaged in autonomous operator assistance and/or advanced operator assistance (e.g., which can correspond to drifting, such as while fishing; a station keeping mode; waypoint navigation; fully autonomous navigation; etc.). In such an example, the timeout period specified can be longer, such as ten minutes, thirty minutes, an hour, etc.

In some embodiments, a user can be permitted and/or prompted to select whether to provide a notification to indicate that a timeout response can be expected to be initiated. For example, a user can be permitted and/or prompted to select whether an audio notification, such as a beep, is to be provided (e.g., via a speaker(s) of the marine vessel, and/or via a speaker of a mobile device associated with the marine vessel). As another example, a user can be permitted and/or prompted to select whether a visual notification (e.g., a warning message) is to be provided (e.g., via a display of the marine vessel and/or a display of a mobile device associated with the marine vessel). As yet another example, a user can be permitted and/or prompted to select whether a haptic notification (e.g., a particular vibration or sequence of vibrations) is to be provided via a haptic device (e.g., a haptic device of a mobile computing device associated with the marine vessel such as a smartphone, or a wireless fob associated with the marine vessel such as a 1ST MATE device available from BRUNSWICK CORP). In some embodiments, a user can be permitted and/or prompted to select an amount of the timeout period after which to provide a notification (e.g., 75%, 90%, etc.).

In some embodiments, a user can be permitted and/or prompted to select how to regulate control of the marine vessel if the timeout period is reached. For example, a user can specify that a reduced speed mode (e.g., a "limp mode") is to be enforced until an authorized operator is detected when the timeout period is reached. In such a mode, a throttle can be limited to a relatively low speed (e.g., an idle speed). Such a mode can permit a non-authorized user to navigate the marine vessel in the event that an authorized user is not available (e.g., because the authorized user fell overboard or otherwise became incapacitated). As another example, a user can specify that throttle is to be reduced to zero until an authorized operator is detected when the timeout period is reached (e.g., which can be performed over a safe period of time, such as 5-10 s, to reduce a likelihood of stopping in an unsafe manner). As yet another example, a user can specify that the throttle can be maintained at the level when the timeout period was reached, and that increases in throttle can be inhibited (e.g., only decreases in throttle to slow or stop the vessel can be permitted). As still another example, a user can specify that full throttle control can be maintained as long as any operator is detected (e.g., detection of an authorized operator may only be necessary when the marine vessel is initially transitioned to an actively operating state). In some embodiments, a user can specify different conditions under which different regulation schemes are to be applied. For example, a user can specify that if a non-authorized operator is detected without the presence of an authorized operator, the marine vessel can be placed into limp mode or throttle can be limited to only decreases (e.g., as such a regulation can prevent a child from controlling the vessel). As another example, a user can specify that if an occupant is likely to have fallen overboard, the marine vessel can be operated in limp mode, even if an authorized operator is not present.

If process 300 determines that the marine vessel is being actively operated ("YES" at 304), process 300 can move to 306.

At 306, process 300 can use one or more facial detection techniques to monitor whether an authorized operator is present at an operational console (e.g., operational console 20) that is useable to control operation of the marine vessel.

In some embodiments, process 300 can determine whether a person is present at an operational console using one or more facial detection and/or facial recognition techniques. For example, process 300 can receive image data from one or more image sensor devices (e.g., camera 80, one or more of depth sensors 72-78), and can analyze the image data to determine whether a face is present using any suitable known facial detection technique or combination of techniques. As another example, process 300 can receive image data from one or more image sensor devices (e.g., camera 80, one or more of depth sensors 72-78), and can determine whether a face present in the image data corresponds to a face of a known and/or authorized person using any suitable known facial recognition technique or combination of techniques.

In some embodiments, when the marine vessel is being actively operated (e.g., including during a transition from an inactive state to an actively operating state), process 300 can analyze image data received from one or more image sensing devices to determine whether an operator (e.g., a person at an active operation console) is an authorized operator of the marine vessel.

At 308, process 300 can send (or not send) an alert and/or regulate control of the marine vessel based on the presence or absence of an authorized operator at an operational console (e.g., operational console 20). For example, if an authorized operator is not present, process 300 can send an alert (e.g., to a mobile device associated with a particular user(s), to a destination associated with a particular user(s), via an output device of the marine vessel such as a display and/or speakers, etc.) indicating that an authorized operator is attempting to operate the marine vessel. In a more particular example, process 300 can cause an alert to be sent that includes an indication that an attempt to control the marine vessel has been made while no authorized operator was present. As another more particular example, such an alert can include one or more images (e.g., one or more still images, a video clip, etc.) that depict an operational area of the marine vessel around the time that an unauthorized attempt to control the marine vessel was made (e.g., including an image that caused the alert to be generated). In some embodiments, process 300 can send an alert to a mobile device (e.g., a smartphone, a wireless fob, etc.) using any suitable communication system(s), such as communication system 210 or communication system 230.

Additionally or alternatively, in some embodiments, at 308, process 300 can regulate control of the marine vessel based on the presence or absence of an authorized operator. For example, if an attempt is made to turn the marine vessel on (e.g., moving an ignition to a "START" position), process 300 can determine whether an authorized operator is present, and if no authorized operator is present, process 300 can regulate control of the marine vessel to inhibit the marine vessel from being turned on (e.g., transitioned to an actively operating state), and/or can inhibit a propulsion system of the marine vessel from being activated (e.g., via preventing signals from being communicated to a PCM of a propulsion device). Otherwise, if an authorized operator is present, process 300 can regulate control of the marine vessel to permit the marine vessel to turn on, and/or can permit control of a propulsion system of the marine vessel.

As another example, if the marine vessel is being actively operated (e.g., by an authorized operator), and process 300 determines that an authorized operator is no longer present, process 300 can regulate control of the marine vessel to inhibit one or more control inputs by a non-authorized operator (e.g., inhibiting changes in thrust from being carried out, inhibiting increases in thrust from being carried out, inhibiting steering changes from being carried out, etc.). Additionally, in such an example, if an authorized operator is absent from the area of the operational console for more than a predetermined period of time (e.g., a timeout period described above, a threshold portion of the timeout period described above), process 300 can cause an alert to be sent, and/or can regulate control of the marine vessel to slow or stop the vessel, to engage one or more autonomous operator assistance and/or advanced operator assistance features that are not currently being used (e.g., to reduce a risk of collision in the event that the operator has become incapacitated).

In some embodiments, monitoring of persons near an operation console via process 300 can mitigate a risk of a child or other unauthorized operator from taking control of the marine vessel when an authorized operator has stepped away from an operation console for a relatively short period of time. Additionally or alternatively, in some embodiments, monitoring of persons near an operation console via process 300 can mitigate a risk of an unauthorized operator (e.g., a criminal, a child, etc.) from starting the marine vessel, and driving the marine vessel away from an area where the vessel is secured without authorization.

In some embodiments, regulation of control of the marine vessel can include various actions or a combination of actions, including doing nothing to inhibit control (e.g., if an authorized operator is present), locking control of the marine vessel completely, turning off an engine(s) and/or motor(s) of the marine vessel, reducing speed of the vessel (e.g., ramping down a throttle toward and/or to zero), permitting only low speed operation (e.g., below a threshold speed and/or throttle), permitting a non-authorized user to decrease (but not increase) a throttle command, permitting a non-authorized user to control the marine vessel (e.g., if the marine vessel was already being operated, if it is likely that an authorized operator has fallen overboard, with an audio and/or visual warning that continued operation will result in the marine vessel contacting emergency services, etc.).

In some embodiments, process 300 can take a first action when an unauthorized person attempts to control the marine vessel, and can escalate to take another action based on a response (or lack of response) to the first action. For example, if an unauthorized person is attempting to control operation of the vessel (e.g., when the marine vessel is initially off, when the marine vessel is already being actively operated, etc.), process 300 can send an alert to a mobile device associated with a user (e.g., a push notification, a text message, an instant message, an email, an alert provided via a wireless fob, an alert provided via an output device(s) of the marine vessel, etc.), which can include an image (e.g., the alert is being provided in a visual format), and the user can be given an opportunity to respond. In a particular example, the user can respond by sending a message to the marine vessel indicative of an action for the marine vessel to take, such as locking controls, permitting operation by the unauthorized operator, etc. As another particular example, the user can respond by approaching an operation console of the marine vessel such that the user (e.g., if the user is an authorized operator) is present. As yet another particular example, the user can choose to contact emergency services, marina security, etc., based on the first action.

As another example, if a first action is taken and a response by the user (or another authorized person/operator) is not taken within a predetermined amount of time, process 300 can take further action, such as locking control of the marine vessel, sending an alert to a third party (e.g., marina security), contacting emergency services, etc.

Otherwise, if process 300 determines that the marine vessel is not being actively operated ("NO" at 304), process 300 can move to 310.

At 310, process 300 can use one or more image sensor devices (e.g., image sensor device 202, such as camera 80, depth sensors 72-78) to monitor security of the marine vessel while in a non-operational state.

In some embodiments, process 300 can determine whether an unauthorized person is present at the marine vessel (e.g., on board the marine vessel) when the marine vessel is not being actively operated and/or at a time when that person (or any person) is not expected to be present at the marine vessel. For example, process 300 can receive image data from one or more image sensor devices (e.g., camera 80, one or more of depth sensors 72-78), and can analyze the image data to determine whether a person is present using any suitable known facial detection technique or combination of techniques, and/or object detection technique or combination of techniques. As another example, process 300 can receive image data from one or more image sensor devices (e.g., camera 80, one or more of depth sensors 72-78), and can determine whether a face present in the image data corresponds to a face of a known and/or authorized person using any suitable known facial recognition technique or combination of techniques.

In some embodiments, at 310, process 300 can determine whether a person that is present at the marine vessel is an authorized person, which can be based in part on a time when the person is determined to be present at the marine vessel and/or based in part on an identity of the person (e.g., whether the person corresponds to an authorized person). Additionally or alternatively, in some embodiments, at 310, process 300 can determine whether a person that is present at the marine vessel is an authorized person based in part on a location of a mobile device (e.g., a wireless fob, a smartphone associated with the marine vessel. For example, if a wireless fob paired with the marine vessel is not present (e.g., there is not an active connection to such a wireless fob), process 300 can determine that the person is not authorized to be present unless the person is a particular operator that is permitted to be present at any time (e.g., specified by a user that sets times at which different authorized persons can be present at the marine vessel). In such an example, if such a wireless fob is present, process 300 can determine that the person is authorized to be present if they are an authorized operator (or alternatively, based on the presence of the fob alone). As another example, if a smartphone or other mobile computing device associated with the marine vessel is not near the marine vessel (e.g., there is not an active connection to such a smartphone, a location of the smartphone received from the smartphone or a cloud service is not within a threshold distance, such as 100 meters), process 300 can determine that the person is not authorized to be present (e.g., unless the person is a particular operator that is permitted to be present at any time).

In some embodiments, when the marine vessel is not being actively operated, process 300 can analyze image data received from one or more image sensing devices to determine whether an operator (e.g., a person at an active operation console) is an authorized operator of the marine vessel.

Additionally or alternatively, in some embodiments, process 300 can determine whether the marine vessel has unexpectedly moved while not being actively operated based on image data captured by one or more cameras. For example, process 300 can compare an object(s) in a scene or a portion of a scene captured by a camera (e.g., camera 80, one or more depth sensors 72-78) to object(s) in a scene or a portion of a scene previously captured by the same camera. If the composition of the scene (or portion of the scene) has significantly changed (e.g., changed by more than a threshold), process 300 can determine that potentially unauthorized activity has occurred (e.g., the marine vessel has moved unexpectedly).

As described above, in some embodiments, when a reliable power source is not available (e.g., shore power, a source of renewable energy, a running generator, etc.), one or more cameras can be configured to operate relatively infrequently (e.g., once every 8 hours, once every 24 hours, once every 48 hours, once every 72 hours, etc.), which can conserve power used to monitor security of the marine vessel when a reliable power source is not available.

In some embodiments, process 300 can cause images to be captured and/or analyzed more frequently and/or asynchronously (e.g., at an irregular interval) in response to one or more conditions being satisfied. For example, as described above, if the marine vessel has been trailered, and more than a threshold amount of movement is detected (e.g., using an IMU(s)), process 300 can cause one or more images to be captured, and can determine whether the marine vessel is moving or has been moved since a last image(s) was captured based on the one or more images that are captured and one or more images that were previously captured.

At 312, process 300 can send (or not send) an alert and/or regulate control of the marine vessel based on detection of unauthorized activity is in image data captured at 310. For example, if potentially unauthorized activity is present, process 300 can send an alert (e.g., to a mobile device associated with a particular user(s), to a destination associated with a particular user(s), via an output device of the marine vessel such as a display and/or speakers, etc.) indicating that potentially unauthorized activity has occurred in connection with the marine vessel. In a more particular example, process 300 can cause an alert to be sent that includes an indication that unauthorized activity has occurred (e.g., a currently unauthorized person has boarded the marine vessel, the marine vessel has moved when it is not actively being operated). As another more particular example, such an alert can include one or more images (e.g., one or more still images, a video clip, etc.) that include evidence of the potentially unauthorized activity (e.g., including an image(s) that caused the alert to be generated). In some embodiments, process 300 can send an alert to a mobile device (e.g., a smartphone, a wireless fob, etc.) using any suitable communication system(s), such as communication system 210 or communication system 230.

Additionally or alternatively, in some embodiments, at 312, process 300 can regulate control of the marine vessel based on the potentially unauthorized activity. For example, if an unauthorized person is detected and/or if the vessel has been moved, process 300 can regulate control of the marine vessel to inhibit the marine vessel from being turned on (e.g., transitioned to an actively operating state), and/or can inhibit a propulsion system of the marine vessel from being activated (e.g., via preventing signals from being communicated to a PCM of a propulsion device) until authorized to do so by an authorized operator and/or an authorized user.

In some embodiments, monitoring of persons at the marine vessel when it is not actively being operated via process 300 can mitigate a risk of unauthorized activity on the marine vessel (e.g., whether it is docked, moored, or trailered), which may potentially result in property damage and/or theft by an unauthorized person, and/or injury of an unauthorized person. Additionally or alternatively, in some embodiments, monitoring of persons at the marine vessel when it is not actively being operated via process 300 can facilitate a user learning of, and potentially preventing, unauthorized activity while the user is not physically at the marine vessel (e.g., the user may be several hours away). Additionally or alternatively, in some embodiments, monitoring of persons at the marine vessel when it is not actively being operated via process 300 can provide information that can be used to potentially deter and/or address adverse unauthorized activity (e.g., property damage, theft, etc.).

In some embodiments, regulation of control of the marine vessel can include various actions or a combination of actions, including doing nothing to inhibit control (e.g., if an authorized operator is present), locking control of the marine vessel completely, turning off an engine(s) and/or motor(s) of the marine vessel, reducing speed of the vessel (e.g., ramping down a throttle toward and/or to zero), permitting only low speed operation (e.g., below a threshold speed and/or throttle), permitting a non-authorized user to decrease (but not increase) a throttle command, permitting a non-authorized user to control the marine vessel (e.g., if the marine vessel was already being operated, if it is likely that an authorized operator has fallen overboard, with an audio and/or visual warning that continued operation will result in the marine vessel contacting emergency services, etc.).

In some embodiments, process 300 can take a first action when potentially unauthorized activity is detected, and can escalate to take another action based on a response (or lack of response) to the first action. For example, if an unauthorized person is present at the marine vessel, process 300 can send an alert to a mobile device associated with a user (e.g., a push notification, a text message, an instant message, an email, an alert provided via a wireless fob, an alert provided via an output device(s) of the marine vessel, etc.), which can include an image (e.g., the alert is being provided in a visual format), and the user can be given an opportunity to respond. In a particular example, the user can respond by sending a message to the marine vessel indicative of an action for the marine vessel to take, such as locking controls, permitting the presence of the unauthorized operator, indicating that movement of the vessel is authorized, etc. As another particular example, the user can respond by approaching an operation console of the marine vessel such that the user (e.g., if the user is an authorized operator) is present (e.g., indicating that the potentially unauthorized activity is authorized activity). As yet another particular example, the user can choose to contact emergency services, marina security, etc., based on the first action.

As another example, if a first action is taken and a response by the user (or another authorized person/operator) is not taken within a predetermined amount of time, process 300 can take further action, such as locking control of the marine vessel, sending an alert to a third party (e.g., marina security), contacting emergency services, etc.

Figure 4:
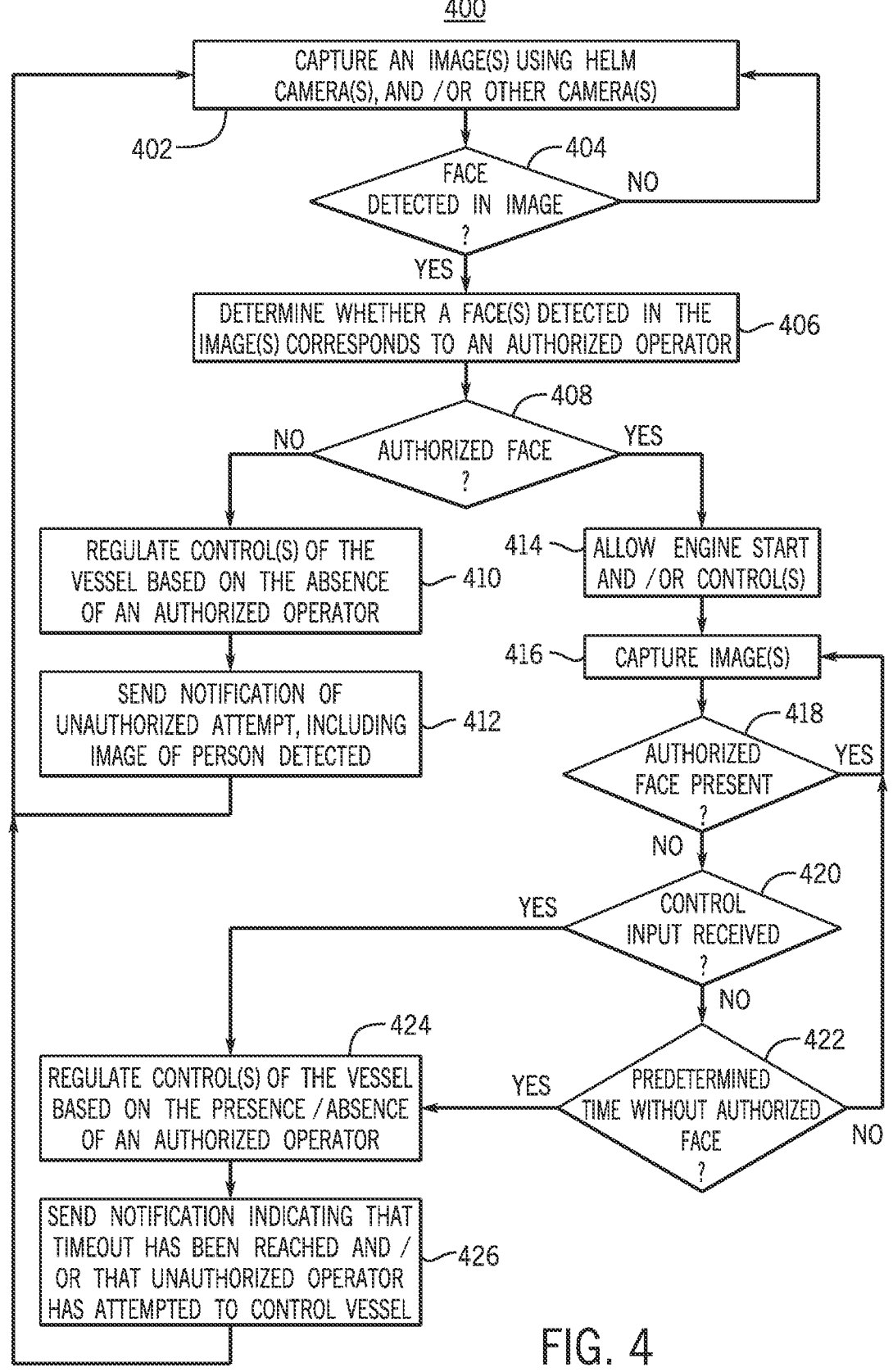
FIG. 4 shows an example of a process for regulating control of an actively operating marine vessel based on whether a person photographed at an operation console of the vessel is authorized to operate the marine vessel in accordance with some embodiments of the disclosed subject matter.

FIG. 4 shows an example of a process for regulating control of an actively operating marine vessel based on whether a person photographed at an operation console of the vessel is authorized to operate the marine vessel in accordance with some embodiments of the disclosed subject matter.

In some embodiments, process 400 can be initiated at any suitable time and/or in response to any suitable event. For example, in some embodiments, process 400 can be initiated when a marine vessel transitions from an inactive state to an actively operating state.

At 402, process 400 can capture one or more images using a helm camera (e.g., a camera with a field of view that includes an area from which an operation console can be accessed, such as camera 80), and/or can capture one or more images using one or more other cameras with a field of view that includes an area from which an operation console can be accessed (which can be the same area or a different area). In some embodiments, while the marine vessel is actively operating, process 400 can cause image data to be captured relatively frequently (e.g., at a frame rate of at least one frame per second, at a frame rate of at least 15 frames per second, at a frame rate of at least 30 frames per second, etc.).

At 404, process 400 can determine whether a face is detected in the image(s) data captured at 402. In some embodiments, process 400 can use any suitable technique or combination of techniques to determine whether a face is present in the image(s), such as any suitable known facial detection technique or combination of techniques.

If process 400 determines that a face is not present in the image(s) of an area(s) from which an operation console can be accessed ("NO" at 404), process 400 can return to 402.

Otherwise, if process 400 determines that a face is present in at least one image of an area(s) from which an operation console can be accessed ("YES" at 404), process 400 can move to 406.

At 406, process 400 can determine if a face in the image(s) captured at 402 corresponds to an authorized operator. In some embodiments, process 400 can use any suitable technique or combination of techniques to determine whether a face in the image(s) corresponds to an authorized operator, such as any suitable known facial recognition technique or combination of techniques. In some embodiments, detection of a face at 404 and a determination of whether a face corresponds to an authorized user can be combined (e.g., a facial recognition technique can include both face detection and face recognition).

In some embodiments, determining whether a face in the image(s) captured at 402 corresponds to an authorized operator can be used to monitor whether an authorized operator is at an operation console, such that the authorized operator can control the marine vessel (e.g., via joystick 30, steering wheel 32, throttle/shift lever 34, etc.). This can mitigate a risk of an unqualified person (e.g., a child) operating the marine vessel without suitable supervision, or that an unauthorized person (e.g., a thief, a vandal, etc.) is attempting to take the marine vessel. For example, if both an authorized operator and an unauthorized person are present, process 400 can determine that an authorized operator is present.

In some embodiments, process 400 can access features stored in memory (e.g., memory 212, memory 232) to determine whether a face in an image corresponds to an authorized face. For example, in some embodiments, a user can provide one or more images of each authorized operator (e.g., via camera 80, via a mobile device executing an application associated with the marine vessel, etc.), and the one or more images can be used to generate features that can be used to determine whether a received image includes the face from which the features were generated. Additionally or alternatively, the one or more images can be stored in memory and used in a facial detection technique that involves comparing labeled image data with unlabeled image data. In such an example, image data stored in memory can be used as features that are accessed to determine whether a face in the image data corresponds to an authorized face.

Additionally or alternatively, in some embodiments, process 400 can use received images of authorized operators to train a model (e.g., a machine learning model) to identify a person in the image as an authorized person. In such embodiments, process 400 can provide unlabeled image data to the trained model, and can receive an output indicative of whether a face in the unlabeled image corresponds to an authorized operator (and/or can include an identity of the face).

In some embodiments, process 400 can determine if a face in the image(s) captured at 402 corresponds to an authorized operator using a remote computing device. For example, a remote computing device (e.g., a server, a mobile device associated with the vessel such as a smartphone) can be configured to perform facial recognition to determine if a particular person is an authorized operator for a particular vessel, and can return an indication of whether the person is authorized and/or an identity of the person (e.g., which can be used by the vessel to determine whether the person is authorized). For example, process 400 can provide at least a portion of the image data captured at 402 to the remote computing device (e.g., using communication system(s) 210 or communication system(s) 230 to transmit the image data using communication network 214), and the remote computing device can perform facial recognition using features stored in memory associated with the remote computing device. As another example, process 400 can provide features based on at least a portion of the image data captured at 402 to the remote computing device, and the remote computing device can perform facial recognition using features stored in memory associated with the remote computing device.

If process 400 determines that no authorized operator is present ("NO" at 408), process 400 can move to 410.

At 410, process 400 can regulate one or more controls of the marine vessel based on the absence of an authorized operator at an operational console. In some embodiments, process 400 can regulate control of the marine vessel using any suitable technique in response to determining that an authorized operator is not present at 408.

For example, in some embodiments, process 400 can regulate control of the marine vessel based on the absence of an authorized operator using one or more techniques described above in connection with 308. In a more particular example, if an attempt is made to turn the marine vessel on (e.g., moving an ignition to a "START" position) without an authorized operator present, process 400 can regulate control of the marine vessel to inhibit the marine vessel from being turned on (e.g., transitioned to an actively operating state), and/or can inhibit a propulsion system of the marine vessel from being activated (e.g., via preventing signals from being communicated to a PCM of a propulsion device). As another more particular example, process 400 can permit the marine vessel to be operated in an inhibited state (e.g., a limp mode).

At 412, process 400 can send a notification indicating that an unauthorized attempt to start the marine vessel has occurred. In some embodiments, the alert sent at 412 can include one or more images of a person detected in the image, and if known, an identify of the person.

In some embodiments, a notification sent at 412 can be sent using any suitable technique or combination of techniques, and can be sent using any suitable component(s). For example, the notification can include information, and can be sent, using any suitable techniques described above in connection with 308 of FIG. 3.

Otherwise, if process 400 determines that an authorized operator is present ("YES" at 408), process 400 can move to 414.

At 414, process 400 can permit an engine (and/or other suitable propulsion device) of the marine to transition to an active state (e.g., an "on" state) and/or can permit operation of one or more controls of the marine vessel. In some embodiments, process 400 can permit an engine start and/or control of the marine vessel by not inhibiting the engine from starting, and/or by not inhibiting operation of the one or more controls (e.g., permitting an engine start and/or operation of controls can require no affirmative action).

At 416, process 400 can capture one or more images using a helm camera (e.g., a camera with a field of view that includes an area from which an operation console can be accessed, such as camera 80), and/or one or more other cameras with a field of view that includes an area from which an operation console (which can be the same area or a different area).

At 418, process 400 can determine if a face in the image(s) captured at 416 corresponds to an authorized operator using any suitable technique or combination of techniques, (e.g., described above in connection with 404 and/or 406).

If process 400 determines that an authorized operator is present ("YES" at 418), process 400 can return to 416 and can continue to capture images. Otherwise, if process 400 determines that an authorized operator is no longer present ("NO" at 418), process 400 can move to 420.

At 420, process 400 can determine whether a control input has been received. In some embodiments, process 400 can determine a control input has been received from any suitable control, such as in response to input provided via keypad 28, joystick 30, steering wheel 32, throttle/shift lever 34, and/or any other suitable control device. For example, process 400 can determine that a control input has been received if a command indicative of a change in control is sent to a controller (e.g., controller 24). In such an example, process 400 can determine whether a command indicative of a change in control (e.g., a steering wheel command, a throttle command, a joystick command, or any suitable steering and/or propulsion command) is received over a CAN bus of the marine vessel that can be expected to cause a change in thrust and/or direction if executed.

If process 400 determines that a control input has not been received ("NO" at 420), process 400 can move to 422.

At 422, process 400 can determine whether a predetermined time without an authorized operator present has elapsed (e.g., since an authorized operator was last detected in an image captured at 416). In some embodiments, the predetermined time can be any suitable period of time, such as a timeout period described above in connection with 302 of FIG. 3.

If process 400 determines that the predetermined time has not elapsed ("NO" at 422), process 400 can return to 416, and can continue to capture images. Otherwise, if process 400 determines the predetermined time has elapsed ("YES" at 422), process 400 can move to 424.

Otherwise, if process 400 determines that a control input has been received ("YES" at 420) or determines that the predetermined time has elapsed ("YES" at 422), process 400 can move to 424.

At 424, process 400 can regulate control of the marine vessel based on the presence or absence of an authorized operator. In some embodiments, process 400 can regulate control of the marine vessel using any suitable technique in response to determining that an authorized operator is not present at 408.

For example, in some embodiments, process 400 can regulate control of the marine vessel based on the absence of an authorized operator, using one or more techniques described above in connection with 308. In a more particular example, if an attempt is made to control the marine vessel without an authorized operator present, process 400 can regulate control of the marine vessel to inhibit any changes to control of the marine vessel, to inhibit any changes that can be expected to increase thrust (e.g., decreases in throttle can be permitted). As another more particular example, process 400 can permit the marine vessel to be operated in an inhibited state (e.g., a limp mode). This can facilitate a non-authorized person operating the marine vessel if an authorized operator has fallen overboard or otherwise become incapacitated.

At 426, process 400 can send a notification indication that a timeout period has been reached and/or that an unauthorized operator has attempted to control the marine vessel (e.g., if a control input was received at 420). In some embodiments, the alert sent at 426 can include one or more images of a person detected in the image, and if known, an identify of the person.

In some embodiments, a notification sent at 426 can be sent using any suitable technique or combination of techniques, and can be sent using any suitable component(s). For example, the notification can include information, and can be sent, using any suitable techniques described above in connection with 308 of FIG. 3.

In some embodiments, process 400 can return to 402, and can capture images to determine whether an authorized operator is present.

Figure 5:
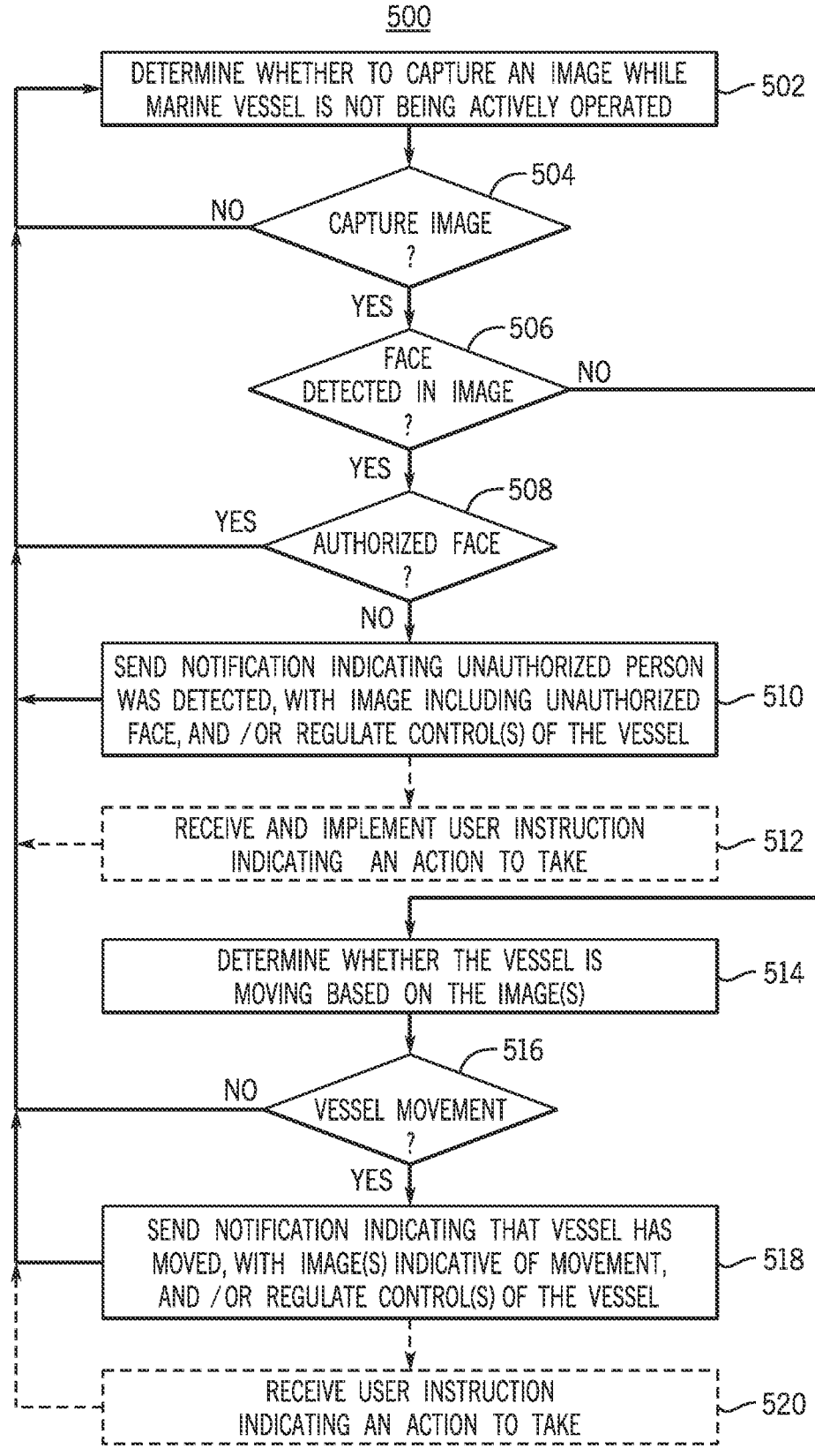
FIG. 5 shows an example of a process for monitoring security of an inactive marine vessel using image data generated by a vision system of the marine vessel in accordance with some embodiments of the disclosed subject matter.

FIG. 5 shows an example of a process 500 for monitoring security of an inactive marine vessel using image data generated by a vision system of the marine vessel in accordance with some embodiments of the disclosed subject matter.

At 502, process 500 can determine whether to capture an image(s) while the marine vessel is not currently being operated. In some embodiments, the marine vessel can be not currently operated when the marine vessel is off, a propulsion system is not active, the vessel is secured, or in any other suitable situation in which the marine vessel is not expected to move under its own power. For example, the marine vessel can be not currently operated if an ignition of the marine vessel is in an "OFF," "ACC" or other position in which the marine vessel is not configured to move under power.

In some embodiments, process 500 can determine that an image(s) is to be captured at 502 based on any suitable condition(s), and/or in response to any suitable event occurring. For example, process 500 can capture images at predetermined intervals, if the marine vessel has unexpectedly moved, etc. For example, process 500 can determine whether an image(s) is to be captured as described above in connection with 310 of FIG. 3. As another example, process 500 can determine whether an image(s) is to be captured as described below in connection with process 600 of FIG. 6.

If process 500 determines that an image is not to be captured ("NO" at 504), process 500 can return to 502. Otherwise, if process 500 determines that an image is to be captured ("YES" at 504), process 500 cause one or more images to be captured, and can move to 506.

At 506, process 500 can determine a face is detected in an image captured at 504 (e.g., using any suitable facial detection and/or facial recognition techniques, such as techniques described above in connection with 404 of FIG. 4).

If process 500 determines that a face is present ("YES" at 506), process 500 can move to 508, and can determine whether a face in the image(s) corresponds to an authorized operator (e.g., using any suitable facial recognition techniques, such as techniques described above in connection with 406 of FIG. 4). In some embodiments, detection of a face at 506 and a determination of whether a face corresponds to an authorized operator at 508 can be combined (e.g., a facial recognition technique can include both face detection and face recognition).

In some embodiments, whether a particular person is authorized at any particular time can vary based on circumstances. For example, in some embodiments, at 508, process 500 can determine whether a person that is present at the marine vessel is an authorized person based on the time when the person is present, based on whether a mobile device associated with the vessel is present (e.g., a wireless fob or a smartphone paired with the marine vessel). As described above in connection with 310 of FIG. 3, whether a particular person is authorized to be present can be based on other circumstances, and an authorized operator may not be authorized to be at the marine vessel at all times (e.g., in the middle of the week if an owner of the marine vessel is not present).

If process 500 determines that a face in the image(s) corresponds to an authorized face ("YES" at 508), process 500 can return to 502. Otherwise, if process 500 determines that no face in the image(s) corresponds to an authorized face ("NO" at 508), process 500 can move to 510.

At 510, process 500 can send a notification indicating that an unauthorized person to start the marine vessel has occurred, and/or can regulate one or more controls of the marine vessel based on the absence of an authorized operator. In some embodiments, the alert sent at 510 can include one or more images of a person detected in the image (and, in some examples, an identify of the person, if known).

In some embodiments, a notification sent at 510 can be sent using any suitable technique or combination of techniques, and can be sent using any suitable component(s). For example, the notification can include information, and can be sent, using any suitable techniques described above in connection with 312 of FIG. 3.

In some embodiments, a notification sent at 510 to a mobile device associated with a user (e.g., a push notification, a text message, an instant message, an email, an alert provided via a wireless fob, etc.), which can include an image (e.g., the alert is being provided in a visual format), can cause a user to be given an opportunity to respond (e.g., via a user interface of the mobile device). In a particular example, the user can respond by sending a message to the marine vessel indicative of an action for the marine vessel to take, such as locking controls, permitting operation by the unauthorized operator, etc. As another particular example, the user can respond by approaching an operation console of the marine vessel such that the user (e.g., if the user is an authorized operator) is present. As yet another particular example, the user can choose to contact emergency services, marina security, etc., based on the first action.

At 512, process 500 can determine whether a user instruction has been received to take a particular action, and can implement an action that is indicated by the user instruction. For example, an instruction can indicate that the person is an authorized person (if they were initially determined not to be an authorized person), that control of the marine vessel is to be locked, etc. In some embodiments, process 500 can omit 512 (e.g., where an instruction is not received, where the marine vessel is not capable of receiving and/or implementing such an instruction, etc.).

Otherwise, if process 500 determines that a face is not present ("NO" at 506), process 500 can move to 514.

At 514, process 500 can determine whether the vessel is moving or has moved based on the image captured at 504 and/or a previously captured image, using any suitable technique or combination of techniques. For example, process 500 can determine whether a difference between the image and previous image (or a region of interest in the image, such as a QR code, and a corresponding region of interest in the previous image) is greater than a threshold (e.g., more than 25% different, more than 33% different, etc.). In such an example, if the difference between the images is greater than the threshold, process 500 can determine that the vessel has moved.

As another example, process 500 can identify points of interest (and locations of the points of interest) in the image and/or can derive any other suitable features from the image, and can determine whether a threshold amount (e.g., a threshold number, a threshold portion) of the points of interest and/or features (e.g., histogram of oriented gradients (HOG)) are present in both images. In such an example, any suitable technique to identify points of interest, from the image data such as: the Harris corner detector; Scale Invariant Feature Transform (SIFT); Speeded Up Robust Feature (SURF); Features from Accelerated Segment Test (FAST); Oriented FAST and Rotated BRIEF (ORB). In such an example, if the threshold amount of points difference between the images is greater than the threshold, process 500 can determine that the vessel has moved.

As yet another example, process 500 can identify objects in the image (e.g., using a machine learning model trained to perform object detection, image segmentation, or any other suitable technique for identifying objects in an image). In such an example, if objects in a previous image (e.g., certain types of objects, such as static objects) are present in about the same location in the new image, process 500 can determine that the vessel has not moved, and otherwise can determine that the vessel has moved.

In some embodiments, process 500 can cause additional image data to be captured if there has been movement (e.g., with a relatively short interval, such as less than one second, one second, etc.), and process 500 can determine whether the marine vessel is currently moving based on the additional images.

In some embodiments, process 500 can determine whether the vessel is likely to be moving based on a position of the horizon (e.g., identified using an edge detection technique(s), and/or any other suitable technique(s)). For example, if a marine vessel is under thrust, the bow of the boat can be expected to rise, causing a FOV of a camera on the marine vessel to change (e.g., the horizon can be expected to move toward a top of a FOV of a camera facing the stern of the vessel, to tilt with respect to a FOV of a camera facing starboard or port, etc.). In some embodiments, if a position of the horizon has changed sufficiently within the image, process 500 can determine that the marine vessel may have moved. In such an example, process 500 can cause an additional image(s) to be captured (e.g., with a relatively short interval, such as less than one second, one second, etc.), and process 500 can determine whether the marine vessel is currently under thrust based on whether the position of the horizon is relatively consistent between the two images. Rough seas can be expected to cause the marine vessel to pitch and/or roll, but such a change can be expected to be transient, whereas a vessel under thrust can be expected to maintain a relatively stable pitch and/or roll.

If process 500 determines that the vessel has not moved based on the image data ("NO" at 516), process 500 can return to 502. Otherwise, if process 500 determines that the vessel has moved based on the image data ("YES" at 516), process 500 can move to 518.

At 518, can send a notification indicating that the vessel has moved, and/or can regulate one or more controls of the marine vessel based on unauthorized movement of the marine vessel. In some embodiments, the notification sent at 518 can include one or more images that caused process 500 to determine that the vessel has moved.

In some embodiments, a notification sent at 518 can be sent using any suitable technique or combination of techniques, and can be sent using any suitable component(s). For example, the notification can include information, and can be sent, using any suitable techniques described above in connection with 312 of FIG. 3.

In some embodiments, a notification sent at 518 to a mobile device associated with a user (e.g., a push notification, a text message, an instant message, an email, an alert provided via a wireless fob, etc.), which can include an image (e.g., the alert is being provided in a visual format), can cause a user to be given an opportunity to respond (e.g., via a user interface of the mobile device). In a particular example, the user can respond by sending a message to the marine vessel indicative of an action for the marine vessel to take, such as locking controls, permitting operation by the unauthorized operator, etc. As another particular example, the user can respond by approaching an operation console of the marine vessel such that the user (e.g., if the user is an authorized operator) is present. As yet another particular example, the user can choose to contact emergency services, marina security, etc., based on the first action.

At 520, process 500 can determine whether a user instruction has been received to take a particular action, and can implement an action that is indicated by the user instruction. For example, an instruction can indicate that movement of the marine vessel is authorized, that control of the marine vessel is to be locked, etc. In some embodiments, process 500 can omit 520 (e.g., where an instruction is not received, where the marine vessel is not capable of receiving and/or implementing such an instruction, etc.).

Figure 6:
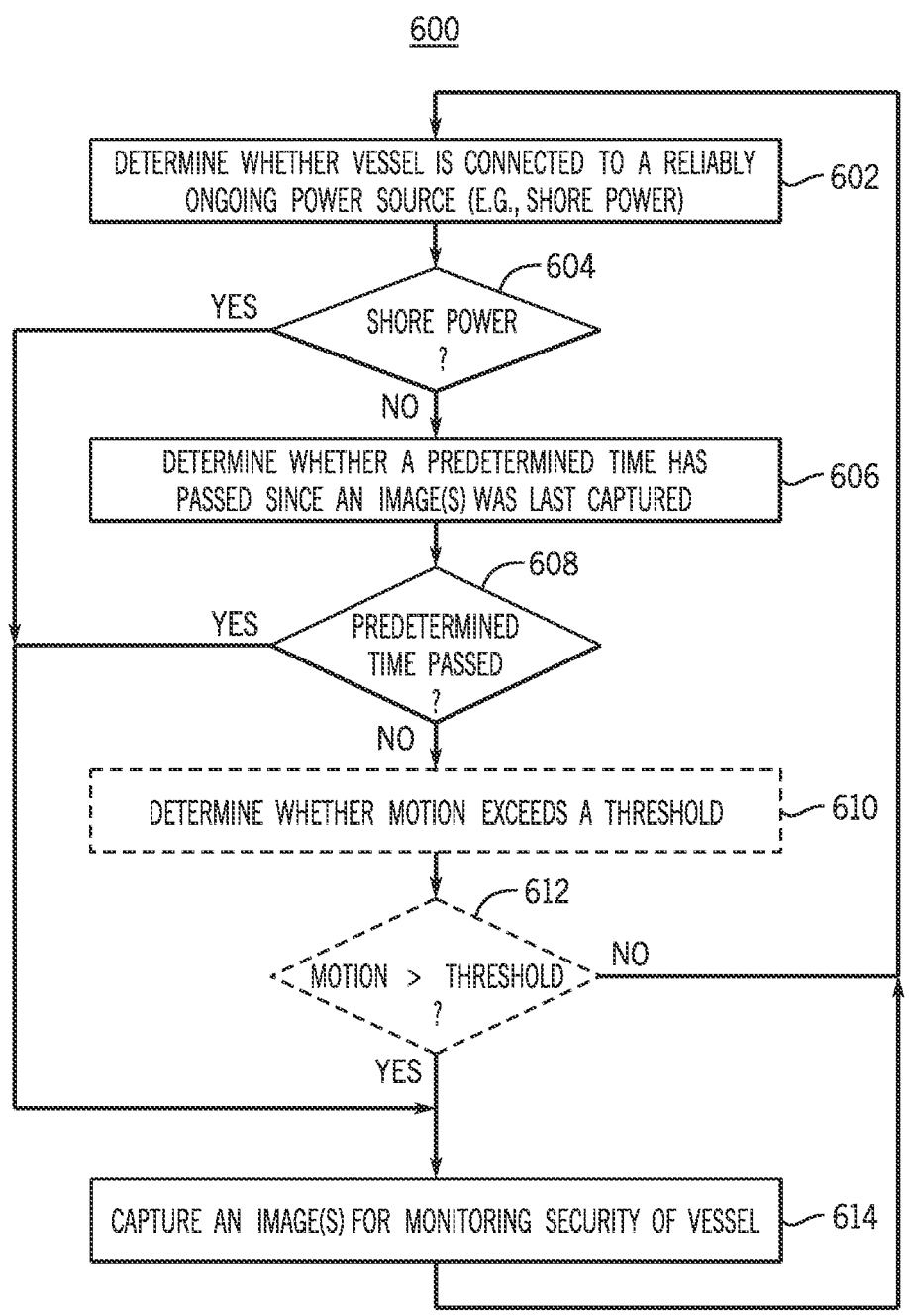
FIG. 6 shows an example of a process for determining whether to capture image data using a vision system of an inactive marine vessel in accordance with some embodiments of the disclosed subject matter.

FIG. 6 shows an example of a process 600 for determining whether to capture image data using a vision system of an inactive marine vessel in accordance with some embodiments of the disclosed subject matter.

At 602, process 600 can whether the marine vessel is connected to a reliable ongoing power source (e.g., shore power, a renewable power source, a running generator, etc.).

If the marine vessel is connected to a reliable ongoing power source ("YES" at 604), process 600 can move to 614, and process 600 can cause one or more cameras to capture an image at a time interval associated with shore power (which can be a frame rate that is used to capture data when the marine vessel is being actively operated, or a lower framerate that can conserve power, such as one frame per second, one frame per minute, one frame per 15 minutes, one frame per hour, etc.).

Otherwise, if the marine vessel is not connected to a reliable ongoing power source ("NO" at 604), process 600 can move to 606.

At 606, process 600 can determine whether a predetermined time has passed since an image(s) was last captured. In some embodiments, the predetermined time can be any suitable period of time, such as a specified time interval at which security is to be monitored when the marine vessel is not being actively operated and a reliable power source is not available, as described above in connection with 302 of FIG. 3.

If process 600 determines that the predetermined period of time has passed ("YES" at 608), process 600 can move to 614, and process 600 can cause one or more cameras to capture an image.

Otherwise, if process 600 determines that the predetermined period of time has not passed ("NO" at 608), process 600 can move to 610.

At 610, process 600 can determine whether an amount of motion exceeds a threshold (e.g., motion indicated by an IMU).

If process 600 determines that the amount of motion exceeds the threshold ("YES" at 612), process 600 can move to 614, and process 600 can cause one or more cameras to capture an image. Otherwise, if process 600 determines that the amount of motion does not exceed the threshold ("NO" at 608), process 600 can return to 602. In some embodiments, 610 and 612 can be omitted. For example, if the marine vessel is trailered, process 610 and 612 can be executed, and if the marine vessel is not trailered, process 610 and 612 can be omitted.

Further Examples Having a Variety of Features

Implementation examples are described in the following numbered clauses:

1. A method for monitoring a marine vessel using a vision system of the marine vessel, the method comprising: determining whether the marine vessel is in an actively operating state; in response to determining that the marine vessel is in an actively operating state, using image data captured by a camera to determine whether a person at an operation console of the marine vessel is an authorized operator, wherein the camera is configured to be mounted to the marine vessel with an associated field of view of that includes an area associated with the operation console of the marine vessel; and regulating control of the marine vessel based on whether the person at the operation console of the marine vessel is an authorized operator.

2. The method of clause 1, wherein the actively operating state comprises a state in which a propulsion system of the marine vessel is configured to provide propulsion.

3. The method any one of clauses 1 or 2, further comprising: receiving image data captured by the camera; determining, using the image data captured by the camera, whether a face is present in the image data captured by the camera; in response to determining that a face is present, determining that the face corresponds to a face of an authorized operator; and determining, based on a presence of the authorized operator in the image data, that a person at the operation console is an authorized operator.

4. The method of clause 3, further comprising: determining whether the face corresponds to a face of an authorized operator using data stored in a memory of the marine vessel that includes features associated with each of one or more authorized operators that is useable to determine whether a face present in the image data corresponds to a face used to generate the features associated with a particular authorized operator of the one or more authorized operators.

5. The method any one of clauses 1 to 4, further comprising: receiving an indication that the marine vessel has transitioned from an inactive state to an actively operating state; receiving image data captured by the camera that includes any people in the area associated with the operation console when the indication is received; determining, using the image data captured by the camera, that one or more faces are present in the image data captured by the camera; determining that no face in the image data corresponds to a face of an authorized operator; in response to determining that no face in the image data corresponds to a face of an authorized operator, regulating control of the marine vessel to inhibit operation of a propulsion system of the marine vessel; and providing, using the wireless communication system of the marine vessel, at least one image including the one or more faces present in the image data to one or more of the as least one users associated with the marine vessel.

6. The method any one of clauses 1 to 5, further comprising: receiving an indication that the marine vessel has transitioned from an inactive state to an actively operating state; receiving image data captured by the camera that includes any people in the area associated with the operation console when the indication is received; determining, using the image data captured by the camera, that one or more faces are present in the image data captured by the camera; determining that at least one of the faces in the image data corresponds to a face of an authorized operator; in response to determining that an authorized operator is present, regulating control of the marine vessel to permit normal operation of a propulsion system of the marine vessel; receiving, at a time subsequent to permitting normal operation of the propulsion system and while the marine vessel remains in the actively operating state, image data captured by the camera that includes the area associated with the operation console; and determining, based on the image data received at the time subsequent to permitting normal operation of the propulsion system, that no authorized operator is present in the area associated with the operation console; and regulating control of the marine vessel to inhibit operation of the propulsion system of the marine vessel based on the determination that an authorized operator is present.

7. The method of clause 6, further comprising: determining that a predetermined period of time has elapsed since a most recent time at which a face of an authorized operator was present in image data received from camera; regulating control of the marine vessel to inhibit operation of the propulsion system of the marine vessel based on the determination that the predetermined period of time has elapsed; and providing an alert indicating that operation of the propulsion system has been inhibited.

8. The method of clause 6, further comprising: determining that a control input has been received during a time period when no authorized operator is present in the area associated with the operation console; regulating control of the marine vessel to inhibit operation of the propulsion system of the marine vessel based on the determination that the control input was received during the time period when no authorized operator is present in the area associated with the operation console; and providing an alert indicating that operation of the propulsion system has been inhibited.

9. The method any one of clauses 1 to 8, further comprising: in response to determining that the marine vessel is not in an actively operating state, use image data captured by the camera to monitor security of the marine vessel; determine that unauthorized activity has occurred in connection with the marine vessel based on the image data captured while monitoring security of the marine vessel; and in response to determining that unauthorized activity has occurred in connection with the marine vessel, provide, using a wireless communication system of the marine vessel, at least one image captured by the camera to at least one user associated with the marine vessel, wherein the at least one image is indicative of the unauthorized activity.

10. The method of clause 9, further comprising: determining, while the marine vessel is not in an actively operating state, that image data is to be captured based on one or more conditions being satisfied; and in response to determining that an image is to be captured, causing the camera to capture image data while the vessel is not in an actively operating state.

11. The method of clause 10, further comprising: determining that a predetermined period of time has elapsed since a most recent time at which image data was received from the camera; and determining that a condition of the one or more conditions is satisfied based on the determination that the predetermined period of time has elapsed since the most recent time at which image data was received from the camera.

12. The method of clause 11, wherein the predetermined time is about one hour when the marine vessel is receiving shore power, and is greater than one hour when the marine vessel is not receiving shore power and is using battery power.

13. The method of clause 12, further comprising: determining that motion is detected in the area where a person is expected to board the marine vessel, wherein the plurality of cameras includes the camera, wherein each of the plurality of cameras is configured to be mounted to the marine vessel with an associated field of view, and wherein a field of view associated with one of the plurality of cameras includes an area where a person is expected to board the marine vessel; and causing a length of the predetermined period of time to decrease at least temporarily based on the determination that motion is detected in the area where a person is expected to board the marine vessel, such that each of the plurality of cameras at least temporarily captures image data more frequently.

14. The method of clause 12, further comprising: determining, based on image data from at least one camera of a plurality of cameras, that a face is present in a field of view associated with the at least one camera, wherein the plurality of cameras includes the camera, and wherein each of the plurality of cameras is configured to be mounted to the marine vessel with an associated field of view; and causing a length of a predetermined period of time to decrease at least temporarily based on the determination that a face is detected in the field of view associated with the at least one camera, such that each of the plurality of cameras at least temporarily captures image data more frequently.

15. The method any one of clauses 10 to 14, further comprising: determining that the marine vessel is trailered; receiving, subsequent to determining that the marine vessel is trailered, data indicative of motion of the marine vessel; determining, based on the data indicative of motion, that motion of the vessel exceeds a threshold; and determining that a condition of the one or more conditions is satisfied based on the motion of the vessel exceeding the threshold.

16. The method any one of clauses 10 to 15, further comprising: receiving image data captured by the camera while the vessel is not in an actively operating state; determining, using the image data captured by the camera while the vessel is not in an actively operating state, that at least one face is included in the image data and that no face in the image data corresponds to a face of an authorized operator; and providing, using the wireless communication system of the marine vessel, at least one image including the at least one face to one or more of the as least one users associated with the marine vessel.

17. The method of clause 16, further comprising: receiving instructions indicating one or more time periods when the marine vessel is expected to be secured and inactive; receiving instructions indicating which of a plurality of authorized operators is authorized to operate the marine vessel during time periods when the marine vessel is expected to be secured and inactive; determining that the image data captured by the camera while the vessel is not in an actively operating state was captured during a time period when the marine vessel is expected to be secured and inactive; determining that no face included in the image data captured by the camera while the vessel is not in an actively operating state corresponds to a face of an authorized operator that is permitted to operate the marine vessel during time periods when the marine vessel is expected to be secured and inactive; and providing, using the communication system, at least one image based on the image data captured by the camera while the vessel is not in an actively operating state to one or more of the as least one users associated with the marine vessel.

18. The method of clause 16, further comprising: receiving instructions indicating one or more time periods when the marine vessel is expected to be secured and inactive; determining that the image data captured by the camera while the vessel is not in an actively operating state was captured during a time period when the marine vessel is expected to be secured and inactive; determining that one or more faces are present in the image data captured by the camera while the vessel is not in an actively operating state; determining that no mobile device associated with the marine vessel is in a vicinity of the marine vessel at a time when the image data captured by the camera while the vessel is not in an actively operating state was captured; and providing, using the communication system, at least one image based on the image data captured by the camera while the vessel is not in an actively operating state to one or more of the as least one users associated with the marine vessel.

19. The method of clause 18, wherein the mobile device comprises an operator fob, and the method further comprises: determining whether a radio signal has been received from the operator fob; and determining that the operator fob is not in the vicinity of the marine vessel based on a determination that no radio signal was received from the operator fob during a time period corresponding to a time when the image data captured by the camera while the vessel is not in an actively operating state was captured; or wherein the mobile device comprises a computing device configured to communicate with the marine vessel via the communication system, wherein the computing device is associated with a particular user of the one or more users, and the method further comprises: receiving, from the computing device using the communication system, location information indicative of a current location of the computing device; and determining that the computing device is not in the vicinity of the marine vessel based on a distance between the location information and a current location of the marine vessel.

20. The method any one of clauses 10 to 19, further comprising: determining that no faces are present in the image data captured by the camera while the vessel is not in an actively operating state; determining, using the image data and previously captured image data, whether the vessel is moving; and in response to determining that the vessel is moving, providing, using the wireless communication system of the marine vessel, at least one image indicative of movement of the vessel.

21. The method any one of clauses 10 to 20, further comprising: receiving, via the wireless communication system of the marine vessel, an instruction to inhibit operation of a propulsion system of the marine from a computing device associated with a particular user of the one or more users; and regulating control of the marine vessel to inhibit operation of the propulsion system of the marine vessel based on the instruction.

22. A system comprising: one or more processors configured to: perform a method of any of clauses 1 to 21.

23. A non-transitory computer-readable medium storing computer-executable code, comprising code for causing a computer to cause a processor to: perform a method of any of clauses 1 to 21.

In some embodiments, any suitable computer readable media can be used for storing instructions for performing functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, or any suitable media that is fleeting and devoid of any semblance of permanence during transmission, and/or any suitable intangible media.

It should be noted that, as used herein, the term mechanism can encompass hardware, software, firmware, or any suitable combination thereof.

It should be understood that above-described steps of the processes of FIGS. 3-6 can be executed or performed in any suitable order or sequence not limited to the order and sequence shown and described in the figures. Also, some of the above steps of the processes of FIG. 3-6 can be executed or performed substantially simultaneously where appropriate or in parallel to reduce latency and processing times.

This written description uses examples to disclose the invention(s), including the best mode, and also to enable any person skilled in the art to make and use the invention(s). Certain terms have been used for brevity, clarity, and understanding. No unnecessary limitations are to be inferred therefrom beyond the requirement of the prior art because such terms are used for descriptive purposes only and are intended to be broadly construed. The patentable scope of the invention(s) is defined by the claims and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for monitoring a marine vessel using a vision system of the marine vessel, the system comprising:
a camera configured to be mounted to the marine vessel with an associated field of view of that includes an area associated with an operation console of the marine vessel;
one or more hardware processors configured to:
determine whether the marine vessel is in an actively operating state;
in response to determining that the marine vessel is in an actively operating state, use image data captured by the camera to determine whether a person at the operation console of the marine vessel is an authorized operator;
receive image data captured by the camera;
determine, using the image data captured by the camera, whether a face is present in the image data captured by the camera;
in response to determining that a face is present, determine that the face corresponds to a face of an authorized operator;
determine, based on a presence of the authorized operator in the image data, that a person at the operation console is an authorized operator; and
regulate control of the marine vessel based on whether the person at the operation console of the marine vessel is an authorized operator.

2. The system of claim 1, wherein the actively operating state comprises a state in which a propulsion system of the marine vessel is configured to provide propulsion.

3. The system of claim 1, wherein the one or more hardware processors are further configured to:
determine whether the face corresponds to a face of an authorized operator using data stored in a memory of the marine vessel that includes features associated with each of one or more authorized operators that is useable to determine whether a face present in the image data corresponds to a face used to generate the features associated with a particular authorized operator of the one or more authorized operators.

4. The system of claim 1, wherein the one or more hardware processors are further configured to:
receive an indication that the marine vessel has transitioned from an inactive state to an actively operating state;
receive image data captured by the camera that includes any people in the area associated with the operation console when the indication is received;
determine, using the image data captured by the camera, that one or more faces are present in the image data captured by the camera;
determine that no face in the image data corresponds to a face of an authorized operator;
in response to determining that no face in the image data corresponds to a face of an authorized operator, regulate control of the marine vessel to inhibit operation of a propulsion system of the marine vessel; and
provide, using a wireless communication system of the marine vessel, at least one image including the one or more faces present in the image data to one or more users associated with the marine vessel.

5. The system of claim 1, wherein the one or more hardware processors are further configured to:
receive an indication that the marine vessel has transitioned from an inactive state to an actively operating state;
receive image data captured by the camera that includes any people in the area associated with the operation console when the indication is received;
determine, using the image data captured by the camera, that one or more faces are present in the image data captured by the camera;
determine that at least one of the faces in the image data corresponds to a face of an authorized operator;
in response to determining that an authorized operator is present, regulate control of the marine vessel to permit normal operation of a propulsion system of the marine vessel;

receive, at a time subsequent to permitting normal opera-
tion of the propulsion system and while the marine
vessel remains in the actively operating state, image
data captured by the camera that includes the area
associated with the operation console; and determine, based on the image data received at the time
subsequent to permitting normal operation of the pro-
pulsion system, that no authorized operator is present in
the area associated with the operation console; and regulate control of the marine vessel to inhibit operation
of the propulsion system of the marine vessel based on
the determination that an authorized operator is present.

6. The system of claim 5, wherein the one or more
hardware processors are further configured to:

determine that a predetermined period of time has elapsed
since a most recent time at which a face of an autho-
rized operator was present in image data received from
camera;

regulate control of the marine vessel to inhibit operation
of the propulsion system of the marine vessel based on
the determination that the predetermined period of time
has elapsed; and provide an alert indicating that operation of the propulsion
system has been inhibited.

7. The system of claim 5, wherein the one or more
hardware processors are further configured to:

determine that a control input has been received during a
time period when no authorized operator is present in
the area associated with the operation console;

regulate control of the marine vessel to inhibit operation
of the propulsion system of the marine vessel based on
the determination that the control input was received
during the time period when no authorized operator is
present in the area associated with the operation con-
sole; and provide an alert indicating that operation of the propulsion
system has been inhibited.

8. The system of claim 1, wherein the one or more
hardware processors are further configured to:

in response to determining that the marine vessel is not in
an actively operating state, use image data captured by
the camera to monitor security of the marine vessel;

determine that unauthorized activity has occurred in con-
nection with the marine vessel based on the image data
captured while monitoring security of the marine ves-
sel; and in response to determining that unauthorized activity has
occurred in connection with the marine vessel, provide,
using a wireless communication system of the marine
vessel, at least one image captured by the camera to at
least one user associated with the marine vessel, wherein the at least one image is indicative of the
unauthorized activity.

9. A system for monitoring a marine vessel using a vision
system of the marine vessel, the system comprising:

a camera configured to be mounted to the marine vessel
with an associated field of view of that includes an area
associated with an operation console of the marine
vessel; and one or more hardware processors configured to:

determine whether the marine vessel is in an actively
operating state;

in response to determining that the marine vessel is in
an actively operating state, use image data captured
by the camera to determine whether a person at the
operation console of the marine vessel is an autho-
rized operator;

regulate control of the marine vessel based on whether
the person at the operation console of the marine
vessel is an authorized operator in response to determining that the marine vessel is not
in an actively operating state, use image data cap-
tured by the camera to monitor security of the marine
vessel;

determine that unauthorized activity has occurred in
connection with the marine vessel based on the
image data captured while monitoring security of the
marine vessel; and in response to determining that unauthorized activity
has occurred in connection with the marine vessel,
provide, using a wireless communication system of
the marine vessel, at least one image captured by the
camera to at least one user associated with the
marine vessel, wherein the at least one image is indicative of the
unauthorized activity.

10. The system of claim 9, wherein the one or more
hardware processors are further configured to:

determine, while the marine vessel is not in an actively
operating state, that image data is to be captured based
on one or more conditions being satisfied; and in response to determining that an image is to be captured,
cause the camera to capture image data while the vessel
is not in an actively operating state.

11. The system of claim 10, wherein the one or more
hardware processors are further configured to:

determine that the marine vessel is trailered;

receive, subsequent to determining that the marine vessel
is trailered, data indicative of motion of the marine
vessel;

determine, based on the data indicative of motion, that
motion of the vessel exceeds a threshold; and determine that a condition of the one or more conditions
is satisfied based on the motion of the vessel exceeding
the threshold.

12. The system of claim 10, wherein the one or more
hardware processors are further configured to:

receive image data captured by the camera while the
vessel is not in an actively operating state;

determine, using the image data captured by the camera
while the vessel is not in an actively operating state,
that at least one face is included in the image data and
that no face in the image data corresponds to a face of
an authorized operator; and provide, using the wireless communication system of the
marine vessel, at least one image including the at least
one face to one or more of the as least one users
associated with the marine vessel.

13. The system of claim 12, wherein the one or more
hardware processors are further configured to:

receive instructions indicating one or more time periods
when the marine vessel is expected to be secured and
inactive;

receive instructions indicating which of a plurality of
authorized operators is authorized to operate the marine
vessel during time periods when the marine vessel is
expected to be secured and inactive;

determine that the image data captured by the camera
while the vessel is not in an actively operating state was
captured during a time period when the marine vessel
is expected to be secured and inactive;

determine that no face included in the image data captured
by the camera while the vessel is not in an actively
operating state corresponds to a face of an authorized operator that is permitted to operate the marine vessel during time periods when the marine vessel is expected to be secured and inactive; and provide, using the communication system, at least one image based on the image data captured by the camera while the vessel is not in an actively operating state to one or more of the as least one users associated with the marine vessel.

14. The system of claim 12, wherein the one or more hardware processors are further configured to:

receive instructions indicating one or more time periods when the marine vessel is expected to be secured and inactive;

determine that the image data captured by the camera while the vessel is not in an actively operating state was captured during a time period when the marine vessel is expected to be secured and inactive;

determine that one or more faces are present in the image data captured by the camera while the vessel is not in an actively operating state;

determine that no mobile device associated with the marine vessel is in a vicinity of the marine vessel at a time when the image data captured by the camera while the vessel is not in an actively operating state was captured; and provide, using the communication system, at least one image based on the image data captured by the camera while the vessel is not in an actively operating state to one or more of the as least one users associated with the marine vessel.

15. The system of claim 14, wherein the mobile device comprises:

an operator fob, wherein the one or more hardware processors are further configured to:

determine whether a radio signal has been received from the operator fob; and determine that the operator fob is not in the vicinity of the marine vessel based on a determination that no radio signal was received from the operator fob during a time period corresponding to a time when the image data captured by the camera while the vessel is not in an actively operating state was captured; or a computing device configured to communicate with the marine vessel via the communication system, wherein the computing device is associated with a particular user of the one or more users, and wherein the one or more hardware processors are further configured to:

receive, from the computing device using the communication system, location information indicative of a current location of the computing device; and determine that the computing device is not in the vicinity of the marine vessel based on a distance between the location information and a current location of the marine vessel.

16. The system of claim 10, wherein the one or more hardware processors are further configured to:

determine that no faces are present in the image data captured by the camera while the vessel is not in an actively operating state;

determine, using the image data and previously captured image data, whether the vessel is moving; and in response to determining that the vessel is moving, provide, using the wireless communication system of the marine vessel, at least one image indicative of movement of the vessel.

17. The system of claim 10, wherein the one or more hardware processors are further configured to:

receive, via the wireless communication system of the marine vessel, an instruction to inhibit operation of a propulsion system of the marine from a computing device associated with a particular user of the one or more users; and regulate control of the marine vessel to inhibit operation of the propulsion system of the marine vessel based on the instruction.

18. The system of claim 10, wherein the one or more hardware processors are further configured to:

determine that a predetermined period of time has elapsed since a most recent time at which image data was received from the camera; and determine that a condition of the one or more conditions is satisfied based on the determination that the predetermined period of time has elapsed since the most recent time at which image data was received from the camera.

19. The system of claim 18, wherein the predetermined period of time is about one hour when the marine vessel is receiving shore power, and is greater than one hour when the marine vessel is not receiving shore power and is using battery power.

20. The system of claim 18, wherein the system comprises:

a plurality of cameras, including the camera, wherein each of the plurality of cameras is configured to be mounted to the marine vessel with an associated field of view, and wherein a field of view associated with one of the plurality of cameras includes an area where a person is expected to board the marine vessel; and wherein the one or more hardware processors are further configured to:

determine that motion is detected in the area where a person is expected to board the marine vessel; and cause a length of the predetermined period of time to decrease at least temporarily based on the determination that motion is detected in the area where a person is expected to board the marine vessel, such that each of the plurality of cameras at least temporarily captures image data more frequently.

21. The system of claim 18, wherein the system comprises:

a plurality of cameras, including the camera, wherein each of the plurality of cameras is configured to be mounted to the marine vessel with an associated field of view; and wherein the one or more hardware processors are further configured to:

determine, based on image data from at least one camera of the plurality of cameras, that a face is present in a field of view associated with the at least one camera; and cause a length of a predetermined period of time to decrease at least temporarily based on the determination that a face is detected in the field of view associated with the at least one camera, such that each of the plurality of cameras at least temporarily captures image data more frequently.

22. A method for monitoring a marine vessel using a vision system of the marine vessel, the method comprising:

determining whether the marine vessel is in an actively operating state;

in response to determining that the marine vessel is in an actively operating state, using image data captured by a camera to determine whether a person at an operation console of the marine vessel is an authorized operator, wherein the camera is configured to be mounted to the marine vessel with an associated field of view of that includes an area associated with the operation console of the marine vessel;

receiving image data captured by the camera;

determining, using the image data captured by the camera, whether a face is present in the image data captured by the camera;

in response to determining that a face is present, determining that the face corresponds to a face of an authorized operator;

determining, based on a presence of the authorized operator in the image data, that a person at the operation console is an authorized operator; and regulating control of the marine vessel based on whether the person at the operation console of the marine vessel is an authorized operator.

23. The method of claim 22, further comprising:

in response to determining that the marine vessel is not in an actively operating state, using image data captured by the camera to monitor security of the marine vessel;

determining that unauthorized activity has occurred in connection with the marine vessel based on the image data captured while monitoring security of the marine vessel; and in response to determining that unauthorized activity has occurred in connection with the marine vessel, provide, using a wireless communication system of the marine vessel, at least one image captured by the camera to at least one user associated with the marine vessel, wherein the at least one image is indicative of the unauthorized activity.

* * * * *